United States Patent
Le

(10) Patent No.: US 7,621,381 B2
(45) Date of Patent: Nov. 24, 2009

(54) FLUID DAMPER

(75) Inventor: Baoloc T. Le, LaPuente, CA (US)

(73) Assignee: Accuride International, Inc., Santa Fe Springs, CA (US)

( * ) Notice: Subject to any disclaimer, the term of this patent is extended or adjusted under 35 U.S.C. 154(b) by 214 days.

(21) Appl. No.: 11/732,895

(22) Filed: Apr. 5, 2007

(65) Prior Publication Data

US 2008/0245630 A1  Oct. 9, 2008

(51) Int. Cl.
*F16F 9/49* (2006.01)
(52) U.S. Cl. ................................... 188/280
(58) Field of Classification Search ........... 188/313, 188/322.19, 322.2, 304, 303, 295, 286, 280
See application file for complete search history.

(56) References Cited

U.S. PATENT DOCUMENTS

| | | | |
|---|---|---|---|
| 2,604,953 A * | 7/1952 | Campbell | 188/314 |
| 5,020,868 A | 6/1991 | Brunnert | |
| 5,207,781 A | 5/1993 | Rock | |
| 5,240,318 A | 8/1993 | Schroder et al. | |
| 5,302,016 A | 4/1994 | Lautenschlager et al. | |
| 5,364,179 A | 11/1994 | Brustle et al. | |
| 5,474,375 A | 12/1995 | Hollenstein et al. | |
| 5,580,138 A | 12/1996 | Grabher | |
| 6,113,204 A | 9/2000 | Jahrling et al. | |
| 6,499,818 B2 | 12/2002 | Brustle | |
| 6,609,597 B1 * | 8/2003 | Heideman | 188/303 |
| 6,629,738 B2 | 10/2003 | Salice | |
| 6,652,050 B2 | 11/2003 | Lin | |
| 6,752,478 B1 | 6/2004 | Francz | |
| 6,799,663 B2 | 10/2004 | Dubach | |
| 6,802,408 B2 | 10/2004 | Krammer | |
| 6,846,053 B2 | 1/2005 | Salice | |
| 6,848,759 B2 | 2/2005 | Doornbos et al. | |
| 6,910,557 B2 | 6/2005 | Doornbos et al. | |
| 6,932,200 B2 | 8/2005 | Booker et al. | |

(Continued)

FOREIGN PATENT DOCUMENTS

DE  197 02 628 A1  4/1998

(Continued)

OTHER PUBLICATIONS

PCT International Search Report, Jul. 22, 2008 (PCT/US2008/004164) (3 pages).

*Primary Examiner*—Melanie Torres
(74) *Attorney, Agent, or Firm*—Pillsbury Winthrop Shaw Pittman LLP

(57) ABSTRACT

A damper including a first fluid conduit in fluid communication with a second fluid conduit via a regulator, a first movable member disposed within the first fluid conduit, a second movable member disposed within the second fluid conduit, and a fluid residing between the first and second movable members. The regulator may include one or more orifices each having a valve disposed therein, wherein the valves are moveable between a seated position and an unseated position with respect to the orifices and are spring biased toward the unseated position. The damper may be spring biased such that when it is mounted on a stationary rail of a drawer slide, and engages with a movable rail of the drawer slide, it urges the drawer slide toward a closed position and dampens the closing motion of the drawer slide.

42 Claims, 15 Drawing Sheets

U.S. PATENT DOCUMENTS

| | | |
|---|---|---|
| 6,953,233 B2 | 10/2005 | Lam et al. |
| 6,979,065 B2 | 12/2005 | Egger |
| 7,040,725 B1 | 5/2006 | Mao-Chin |
| 7,077,487 B2 | 7/2006 | Yang |
| 7,077,488 B2 | 7/2006 | Wiklund et al. |
| 7,104,691 B2 | 9/2006 | Chi |
| 7,108,339 B2 | 9/2006 | Berger |
| 7,147,216 B2 | 12/2006 | Gassner et al. |
| 2004/0104650 A1 | 6/2004 | Egger |
| 2004/0183411 A1 | 9/2004 | Boks |
| 2004/0222723 A1 | 11/2004 | Fitz |
| 2007/0001562 A1 | 1/2007 | Park |

FOREIGN PATENT DOCUMENTS

| | | |
|---|---|---|
| DE | 20 2006 011 846 U1 | 12/2007 |
| GB | 388112 | 2/1933 |

* cited by examiner

FLUID DAMPER

BACKGROUND OF THE INVENTION

This invention relates generally to dampers, and more particularly to fluid dampers which dampen the motion of movable furniture components.

A damper is often used to dampen the motion of a movable furniture component such as a window, door, drawer, lid, tray or shelf. Damping helps prevent damage to not only the movable furniture component, but also the object that the movable furniture component will strike at the end of its movement such as a window frame, a door frame, a drawer cabinet, a container, a desk, or a bookshelf. Damping also decreases noise and vibration caused when a movable furniture component contacts an object at the end of its movement. Dampers are particularly useful when used in connection with drawers because drawers are often in settings in which quiet and gentle closure is desired. Thus, dampers are widely used in conjunction with drawer slides and in conjunction with drawer closing devices.

However, the typical damper lacks the ability to adequately vary the amount of damping based on the speed of the movable furniture component while it is engaged with the damper. When the furniture component is moving at a high rate of speed, the typical damper either over-dampens, causing the furniture component to come to a complete stop or rebound, or under-dampens, allowing the furniture component to slam against an associated object. In addition, while the typical damper may be operably coupled to a drawer closing device, it is a separate component. As a result, this arrangement consumes more space, is more expensive to manufacture and assemble, and is more susceptible to mechanical failure.

Therefore, a more reliable, compact and cost-effective damper capable of adequately varying the amount of damping based on the speed of an associated movable furniture component and of being fully integrated with a drawer closing device would be highly beneficial.

SUMMARY OF THE PREFERRED EMBODIMENTS

An embodiment of the present invention includes two fluid conduits in fluid communication with each other via a regulator. A movable member is slideably arranged within each fluid conduit, and a fluid is disposed between the moveable members. Damping occurs when a movable furniture component engages a movable member in one fluid conduit, causing it to shuttle the fluid through the regulator and into the other fluid conduit.

The regulator impedes the fluid flow to varying degrees based on how fast the furniture component is moving. The regulator may include one or more orifices, each with a movable valve disposed therein. The valves may include one or more bypass channels and may be spring biased toward an unseated position within the orifices. As fluid moves through the orifices in the damping direction, the valves are urged by the fluid pressure toward a seated position within the orifices. As fluid pressure increases, the valves move closer to the fully seated position and impede the fluid flow to a greater degree. Thus, if a furniture component moving at a relatively high rate of speed strikes the piston rod, the valves move to a fully seated position and allow the fluid to pass through only the bypass channels. As the furniture component slows down, the fluid pressure on the valves decreases, and the valves move back toward the unseated position. In this way, a moving furniture component can be quickly slowed, and then allowed to continue at a slow speed.

In a further embodiment of the invention, the fluid is provided between respective ends of two piston rods that serve as racks in a rack-and-pinion system. Accordingly, the piston rods interact with each other via a pinion. This helps prevent fluid from being squeezed out from between the piston rods by fixing the movement of the piston rods relative to each other.

In a preferred embodiment of the invention, the piston rods may be spring biased in opposite directions, with one of the piston rods coupled to an actuating member such as a pin. The damper may be mounted on the stationary rail of a drawer slide. A movable rail may be coupled to the stationary rail, and may be movable between an extended position and a retracted position with respect to the stationary rail. The pin may engage a coupling member such as a setter on the movable rail to move the drawer slide to a retracted position in a dampened manner.

BRIEF DESCRIPTION OF THE DRAWINGS

A detailed description of embodiments of the invention will be made with reference to the accompanying drawings, wherein like numerals designate corresponding parts in the figures.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

It is also noted that the embodiments of the present invention are partly described in the context of a drawer slide because they have particular utility in this context. However, the inventions disclosed herein can be used in other contexts as well including, without limitation, windows, doors, trays, lids, shelves, tables, and the like.

The term "proximal" is used to describe a component or a part of a component that is nearest the regulator. The term "distal" is used to denote another component or a different part of the component that is farther away from the regulator. In other words, the point of reference for the terms "proximal" and "distal" is the regulator.

Figure 1:
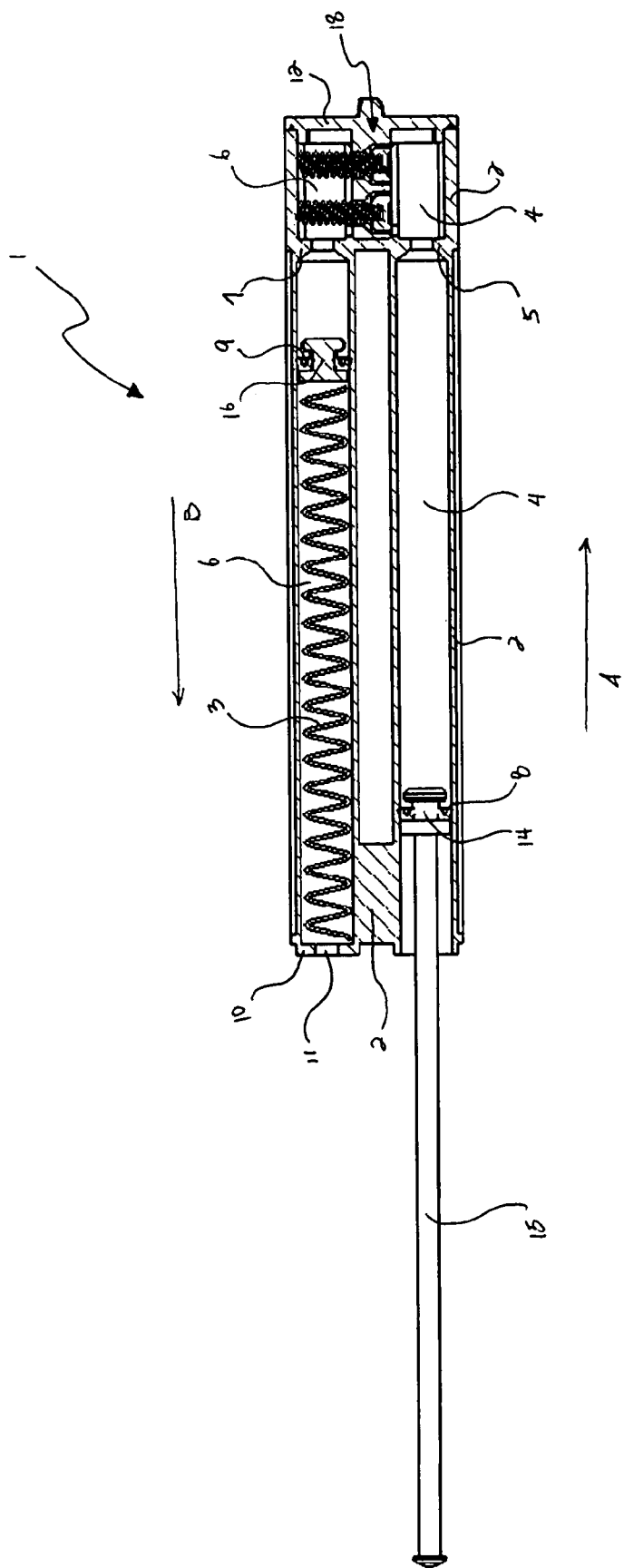
FIG. 1 is a plan view of a damper according to one embodiment of the invention, the damper being in an open position.

FIG. 1 is a plan view of a damper 1 according to one embodiment of the invention, the damper 1 being in an open position. The damper 1 includes a housing 2. The housing includes a first fluid conduit 4, a second fluid conduit 6, a proximal wall 12 and a distal wall 10, the distal wall 10 having an airhole 11. The housing further includes a first annular protrusion 5 which extends from an interior surface of the first fluid conduit 4, and a second annular protrusion 7 which extends from an interior surface of the second fluid conduit 6.

The damper 1 further includes a spring 3, a regulator 18 (see FIGS. 2 and 3), a first piston disc 14, a piston rod 15 having an annular seal 8 and a second piston disc 16 having an annular seal 9. The first piston disc 14 is slideably arranged within the first fluid conduit 4. The second piston disc 16 is slideably arranged within the second fluid conduit 6. The first annular protrusion 5 and the second annular protrusion 7, provide stop surfaces for the first and second piston discs, respectively. The first fluid conduit 4 is in fluid communication with the second fluid conduit 6 via the regulator 18. A fluid resides between the first piston disc 14 and the second piston disc 16. Each of the annular seals 8 and 9 is configured to fit tightly against the inner surface of the associated fluid conduit to prevent fluid from leaking out from between the first and second piston discs.

Figure 1A:
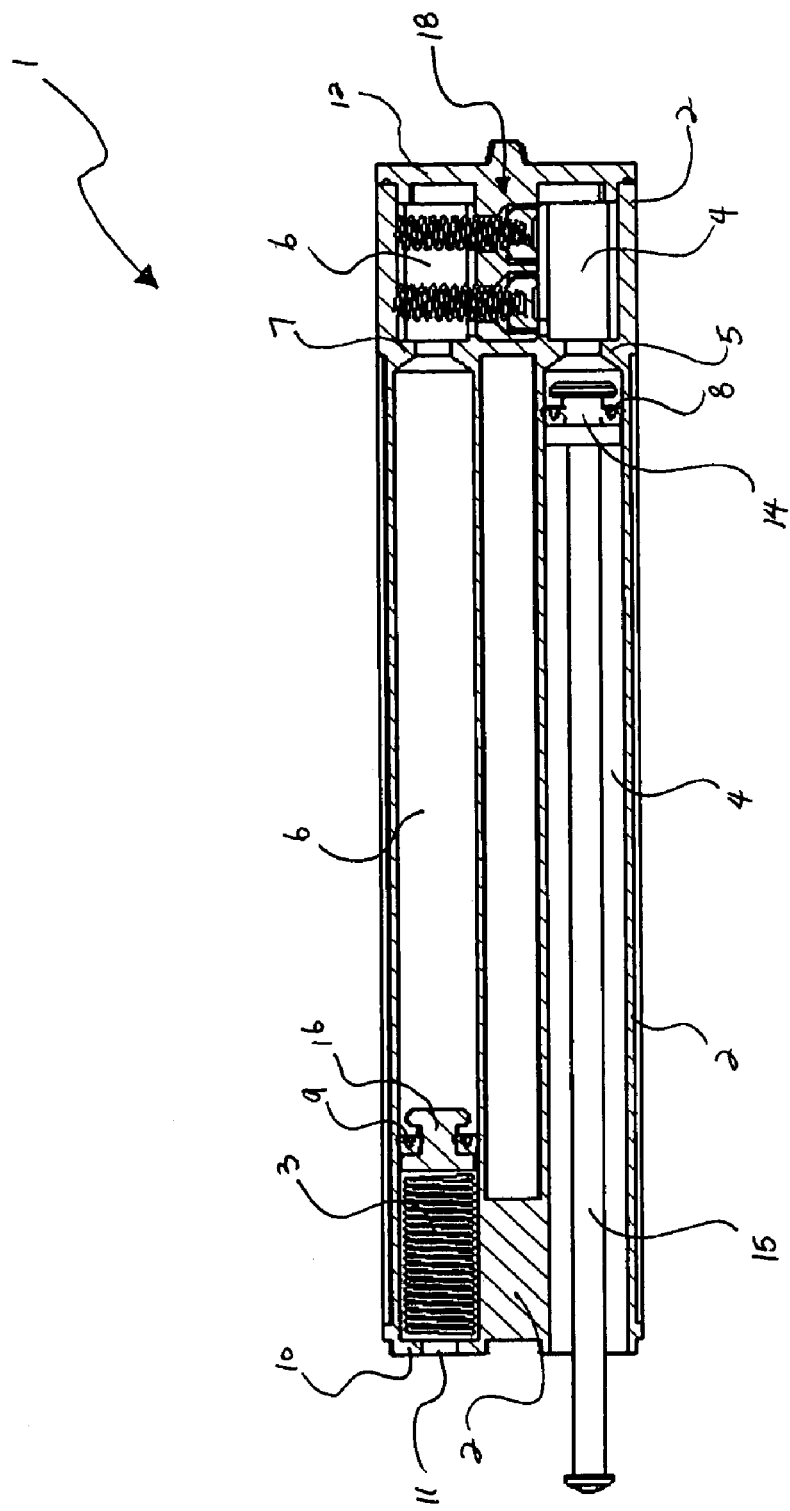
FIG. 1A is a plan view of the damper of FIG. 1 in a closed position.

FIG. 1A is a plan view of the damper of FIG. 1 in a closed position. Thus, the closing direction of the damper is the direction in which the piston rod 15 moves as it slides from an extended position to a retracted position with respect to the first fluid conduit (see Arrow A in FIG. 1). The opposite direction is the opening direction of the damper (see Arrow B in FIG. 1).

Figure 2:
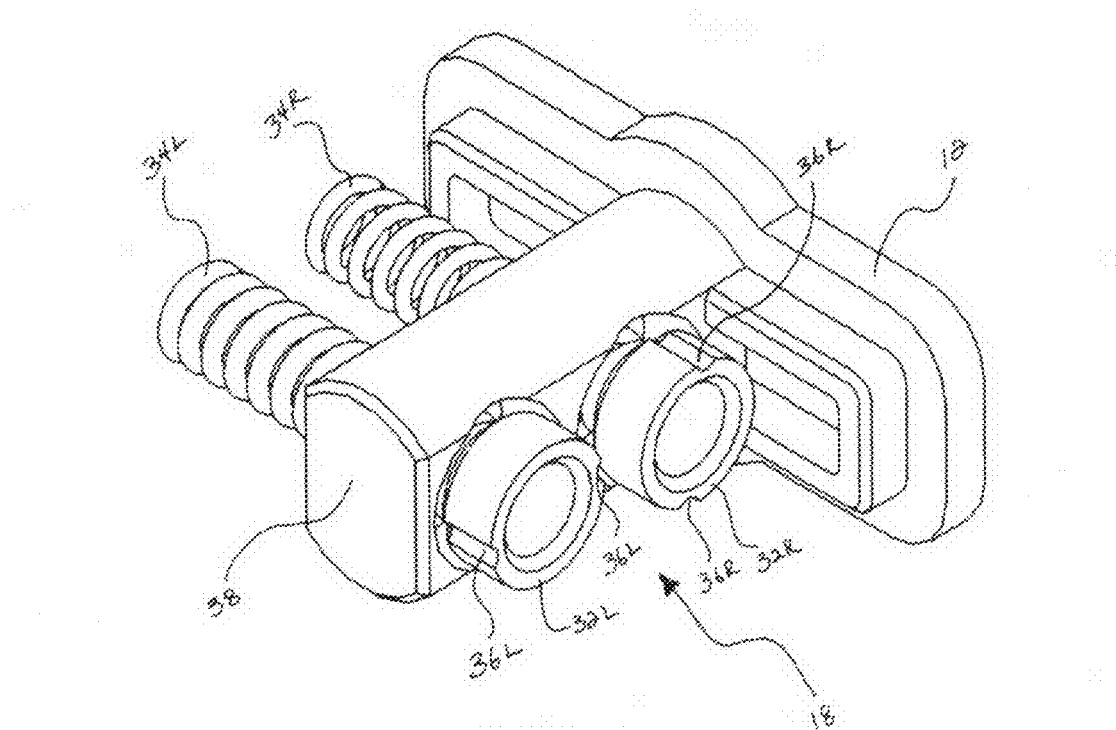
FIG. 2 is a perspective view of a regulator according to an embodiment of the present invention.
Figure 3:
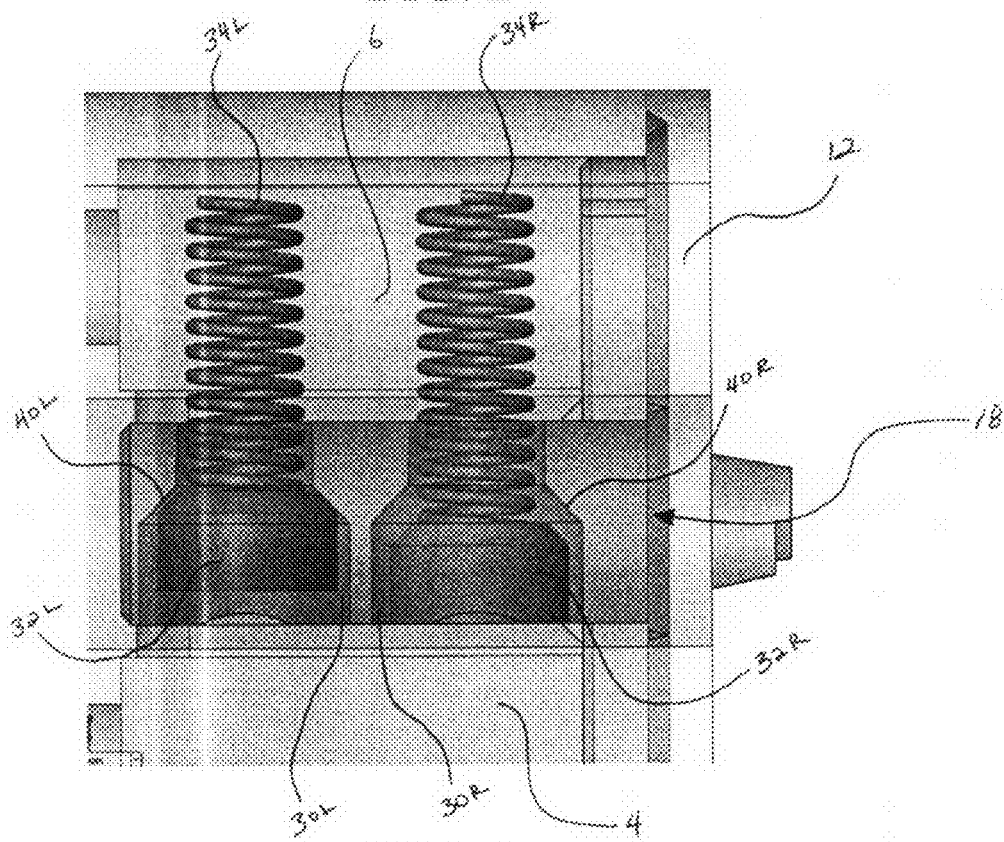
FIG. 3 is a plan view of the regulator of FIG. 2.

FIGS. 2 and 3 illustrate the regulator 18. FIG. 2 is a perspective view of the regulator 18. FIG. 3 is a plan view of the regulator 18. The regulator 18 includes a regulator housing 38 which defines orifices 30L and 30R. The regulator housing 38 includes valve seats 40L and 40R. The regulator 18 further includes valves, 32L and 32R, and valve springs, 34L and 34R. The left valve 32L has two bypass channels 36L. The right valve 32R has two bypass channels 36R.

One end of the left valve spring 34L may be coupled to an interior surface of the proximal end of the second fluid conduit 6, and the other end, which is positioned within the left orifice 30L, may be coupled to the left valve 32L. Similarly, one end of the right valve spring 34R may be coupled to an interior surface of the proximal end of the second fluid conduit 6, and the other end, which is positioned within the right orifice 30R, may be coupled to the right valve 32R. In an alternative embodiment, the valve springs may be coupled to an interior surface of the first fluid conduit 4 or the regulator housing 38, rather than an interior surface of the second fluid conduit.

The valve springs 34L and 34R are configured such that the valves 32L and 32R are movable between a seated position against the valve seat, as is the case with the left valve 32L in FIG. 3, and an unseated position spaced away from the valve seat, as is the case with the right valve 32R in FIG. 3. The valve springs 34L and 34R are configured to bias the valves 32L and 32R toward the unseated position. As a result, when no pressure is exerted on the valve springs 34L and 34R, there is a space between the valves 32L and 32R and the valve seats 40L and 40R through which the fluid can flow.

In operation, a movable furniture component, e.g., a drawer, lid, tray, door, window, etc., moving generally in the closing direction of the damper, presses against the piston rod 15. Consequently, the first piston disc 14 is driven further within the first fluid conduit 4 thereby forcing the fluid to move through the regulator 18 and into the second fluid conduit 6. The position of the valves 32L and 32R, and thus, the amount of damping, changes depending on the amount of pressure exerted by the fluid on the valves as the fluid moves through the orifices 30L and 30R.

If the movable furniture component is moving slowly, only a small amount of pressure is exerted on the valves 32L and 32R. Consequently, the valves, which are biased toward the unseated position, move toward the seated position only slightly, and the valves do not impose a significant obstruction with respect to the fluid flow. Thus, when the movable furniture component is moving in the closing direction of the damper at a slow rate of speed, only a minimal amount of damping occurs.

If the movable furniture component is moving at a moderate speed, a greater degree of pressure is exerted on the valves 32L and 32R. Consequently, the valves move toward the seated position to a greater degree, leaving little space for the fluid to flow between the valves 32L and 32R and the valve seats 40L and 40R. Thus, when the movable furniture component is moving in the closing direction of the damper at a moderate rate of speed, an increased amount of damping occurs.

If the movable furniture component is moving at a relatively high speed, enough pressure may be exerted by the fluid on the valves 32L and 32R to cause the valves to move to the seated position. In this situation, the only way for the fluid to flow through the orifices 30L and 30R is through the bypass channels 36L and 36R. Thus, when the movable furniture component is moving at a relatively high rate of speed, a maximum amount of damping may occur. The bypass channels help prevent a temporary stopping of the closing movement of the drawer slide because at least some fluid is allowed to pass through the orifices. The bypass channels also help prevent excess pressure from building up in the first fluid conduit which could possibly damage the structure of the damper or cause fluid to leak out of the damper.

In practice, the regulator 18 automatically adjusts to the variation in the speed of movement of the movable furniture component. For example, when a furniture component moving at a relatively high rate of speed strikes the piston rod 15, the valves 32L and 32R move to a fully seated position and allow the fluid to pass through only the bypass channels 36L and 36R. As the furniture component slows down, the fluid pressure on the valves decreases, and the valves move back toward the unseated position. In this way, a fast moving furniture component can be quickly slowed, and then allowed to continue at a slow rate of speed.

Referring back to FIGS. 1 and 1A, as the fluid flows from the first fluid conduit 4, through the regulator 18 and into the second fluid conduit 6, the fluid exerts pressure on the second piston disc 16 in the opening direction of the damper (see Arrow B in FIG. 1). This causes the second piston disc 16 to slide toward the distal wall 10. The airhole 11 allows the air between the second piston disc and the distal wall to escape.

Once the damper has reached the fully closed position, it remains in that position until either the piston rod 15 is retracted from the first fluid conduit 4, or the second piston disc 16 is moved toward the second annular protrusion 7. In either case, the fluid is transferred back from the second fluid conduit 6 to the first fluid conduit 4 through the regulator 18. Because the fluid is now moving through the orifices 30L and 30R toward the first fluid conduit 4, pressure is exerted on the valves 32L and 32R in a direction away from the valve seats 40L and 40R. Thus, if the valves move at all, they will move away from the valve seats, creating more space for the fluid to flow between the valves and the valve seats. Thus, the valves 32L and 32R impose only a minimal amount of resistance against the flow of the fluid as it moves through the regulator from the first fluid conduit 4 to the second fluid conduit 6.

To allow for the automatic return of the damper to the fully open position, a spring 3 may be provided to act on the second piston disc 16. The spring 3 may be positioned between the second piston disc 16 and the distal wall 10. The spring may bias the second piston disc 16 toward the second annular protrusion 7. Thus, when a furniture component presses the piston rod 15 into the first fluid conduit 4, the second piston disc moves toward the distal wall 10, thereby compressing the spring 3. The spring force of the spring 3 is generally insufficient to overcome the weight of the furniture component so that, when the furniture component is abutting the piston rod 15 and the spring 3 is compressed, the furniture component remains in the same position until it is moved by an external force. Once the furniture component is moved away from the piston rod 15, the spring 3 expands, urging the second piston disc 16 toward the second annular protrusion 7. This causes the fluid to flow back to the first fluid conduit 4, which causes the first piston disc 14 to move in the opening direction of the damper (see Arrow B in FIG. 1). Once the spring has expanded to the point where the second piston disc 16 is abutting the second annular protrusion 7, the damper has reached the fully open position.

In an alternative embodiment, an expansion or extension type spring may be provided instead of spring 3, which is of the compression type, and may be positioned between the second piston disc 16 and the second annular protrusion 7. As with the spring 3, the extension spring may bias the second piston disc 16 toward the second annular protrusion 7. Therefore, in the alternative embodiment, when a furniture component presses the piston rod 15 into the first fluid conduit 4, the second piston disc 16 moves toward the distal wall 10. As this occurs, the extension spring expands such that, when the furniture component is moved away from the piston rod, the extension spring retracts, urging the second piston disc 15 toward the second annular protrusion 7.

In another alternative embodiment, the piston rod 15 may be coupled to a movable furniture component, rather than to the first piston disc 14. In this case, the movable furniture component may be moving in a direction substantially parallel to the first fluid conduit 4, and the piston rod 15 may be aligned with the first fluid conduit 4.

In yet another alternative embodiment, an additional piston rod may be provided, and may be coupled to the second piston disc 16. The damper may then be returned to the fully open position by pressing the additional piston rod into the second fluid conduit 6.

The damper 1 may be coupled to a separate closure device such as a typical spring-biased drawer closing device to provide dampened closure. For example, the actuating, movable, or sliding member of a typical spring-biased drawer closing device may be coupled to the piston rod 15. In this arrangement, when an associated drawer is pushed close, the drawer engages the actuating member which is coupled to the piston rod 15. As the piston rod 15 is pushed to a retracted position within the first fluid conduit 4, the regulator 18 impedes the fluid flow which results in resistant pressure on the piston rod, and damping is achieved.

Figure 4:
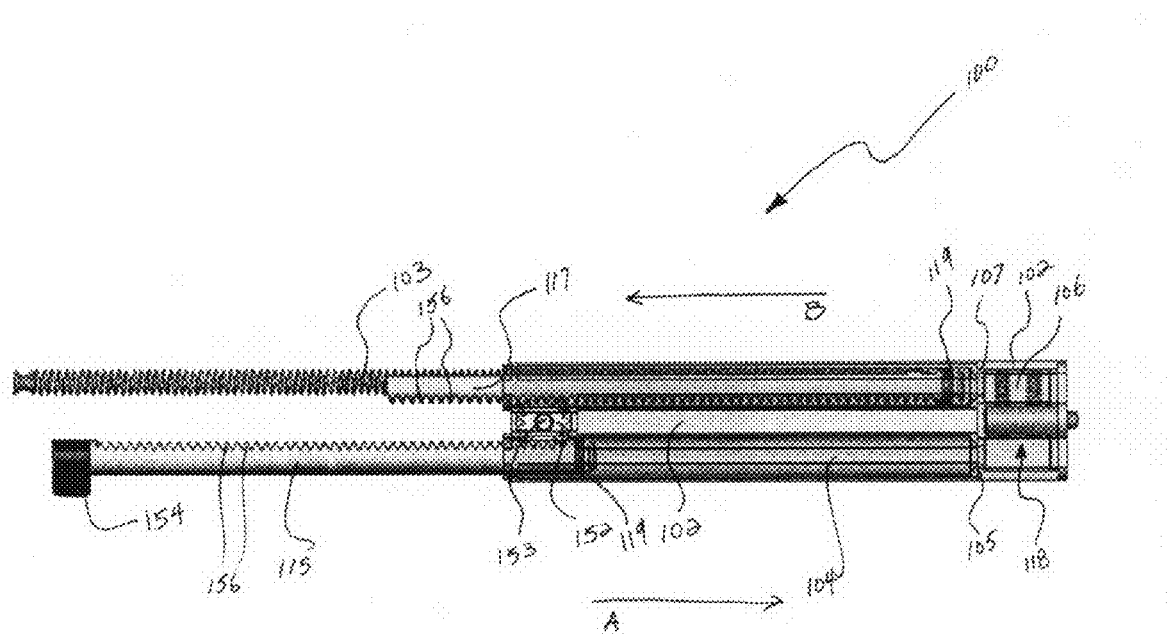
FIG. 4 is a plan view of a damper employing a rack-and-pinion system, the damper being in an open position.

FIG. 4 is a plan view of a damper 100 employing a rack-and-pinion system, the damper 100 being in an open position. In the embodiment of FIG. 4, the damper includes a housing 102, a piston spring 103, a pinion 152, a shaft member 153, an actuating member or a pin 154, a regulator 118, a first piston rod 115 and a second piston rod 117. The pin 154 is coupled to the distal end of the first piston rod 115. A fluid resides between the first and second piston rods. Both piston rods include annular seals 119 to prevent leakage of fluid, and teeth 156 to mesh with the pinion 152. The housing 102 includes a first fluid conduit 104 and a second fluid conduit 106, wherein the first piston rod 115 is slideably arranged within the first fluid conduit, and the second piston rod 117 is slideably arranged within the second fluid conduit. The first fluid conduit 104 is in fluid communication with the second fluid conduit 106 via the regulator 118. The first fluid conduit 104 includes a first annular protrusion 105 which extends from an interior surface of the first fluid conduit and provides a stop surface for the first piston rod 115. The second fluid conduit 106 includes a second annular protrusion 107 which extends from an interior surface of the second fluid conduit and provides a stop surface for the second piston rod 117. One end of the piston spring 103 is coupled to the second piston rod 117 while the other end may be coupled to a stationary furniture component, i.e., a drawer enclosure or a stationary rail of a drawer slide.

Figure 4A:
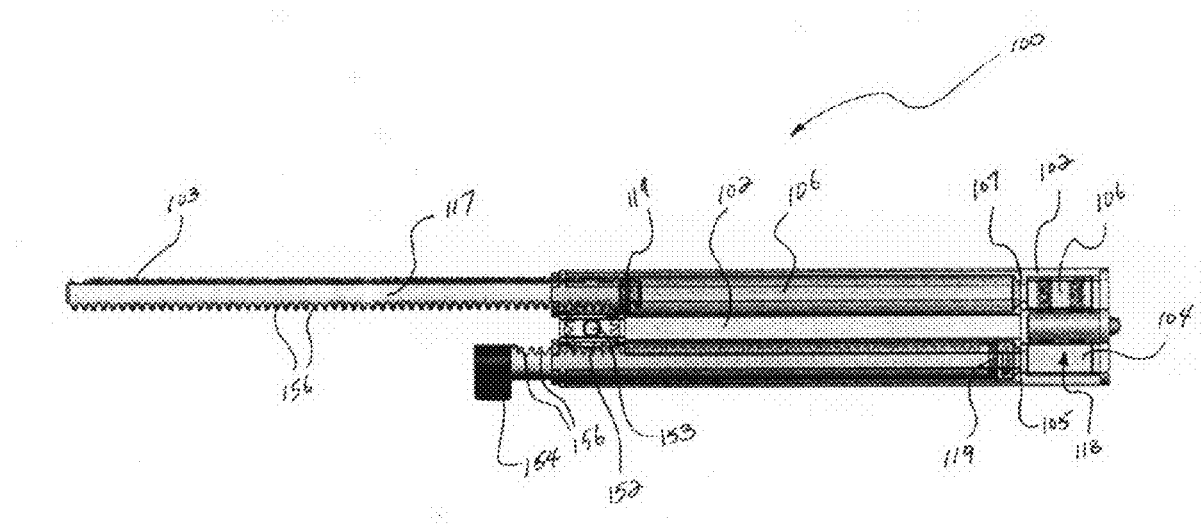
FIG. 4A is a plan view of the damper of FIG. 4 in a closed position.

FIG. 4A is a plan view of the damper of FIG. 4 in a closed position. Thus, the closing direction of the damper 100 is the direction in which the first piston rod 115 moves as it slides from an extended position to a retracted position with respect to the first fluid conduit 104 (see Arrow A in FIG. 4). The opposite direction is the opening direction of the damper 100 (see Arrow B in FIG. 4).

The pinion 152 is rotatably fixed to the housing via the shaft member 153, and is positioned between the first piston rod 115 and the second piston rod 117. The pinion 152 operably engages simultaneously with both the first piston rod 115 and the second piston rod 117 such that, as the first piston rod 115 moves in one direction, the second piston rod 117 moves in an opposite direction, and vice versa.

Figure 5:
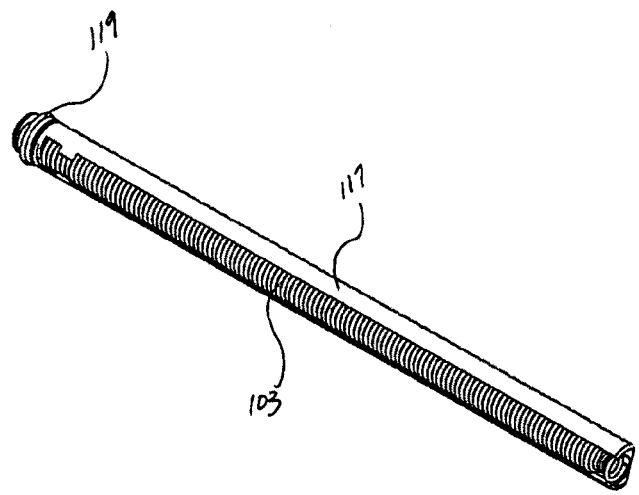
FIG. 5 is a perspective view of a piston rod in accordance with an embodiment of the present invention.

As shown in FIG. 5, the piston spring 103 may be positioned within the hollow interior of the second piston rod 117.

The piston spring 103 may be of the expansion type and thus, may bias the second piston rod 117 in the opening direction of the damper 100. As such, the first piston rod 115 may be biased in the closing direction of the damper 100 due to the interaction of the second piston rod 117 and the first piston rod 115 via the pinion.

In operation, the pin 154 may engage with a movable furniture component such as a tray, a drawer, or the like to move the movable furniture component in the closing direction (see Arrow A in FIG. 4) of the damper 100 in a controlled, dampened manner. Damping in this embodiment is achieved in the same way as described with respect to the embodiment of FIGS. 1 and 1A. More specifically, the regulator 118 of FIGS. 4 and 4A operates in the same way as the regulator 18 of FIGS. 1 and 1A.

By way of example, the damper of this embodiment may be mounted in an enclosure holding a small tray with the pin being engaged with the tray. A person may pull the tray open, i.e., to view its contents, put something in the tray, or take something out of the tray. The tray may be provided with a means to lock the tray in an open position. Once the tray is unlocked from the open position, the tray may be drawn to a fully inserted position within the enclosure due to the spring bias on the second piston rod 117, which, due to the interaction between the first and second piston rods via the pinion 152, biases the pin 154 in the closing direction of the damper 100.

Figure 6:
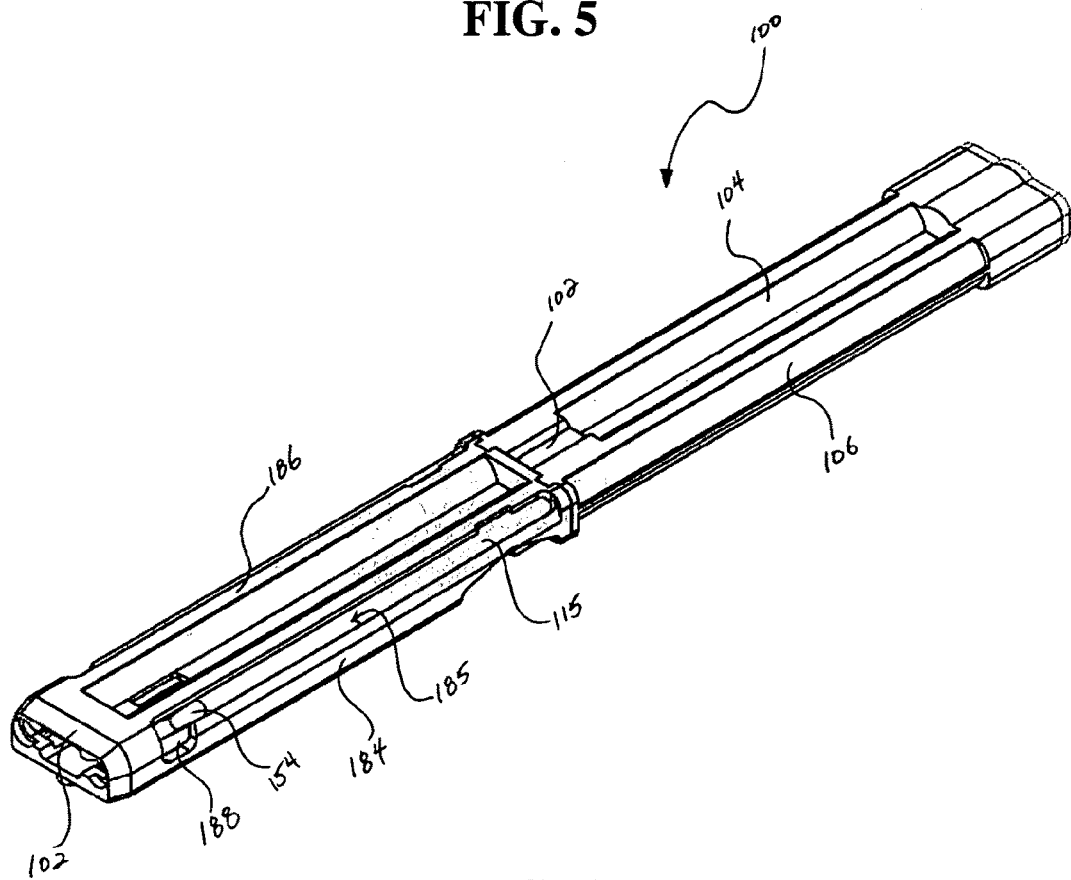
FIG. 6 is a perspective view of a damper according to an embodiment of the present invention, the damper being in an open position.

FIG. 6 shows the damper of FIGS. 4 and 4A, wherein the housing further includes a first chamber 184 and a second chamber 186 which are in-line with and connected to the first and second fluid conduits 104 and 106, respectively, such that the first chamber 184 encloses the portion of the first piston rod 115 that extends out from the first fluid conduit 104 and the second chamber 186 encloses the portion of the second piston rod 117 that extends out from the second fluid conduit 106. In this embodiment, the piston spring 103, shown in FIG. 4, is coupled to the housing 102 at the distal end of the second chamber 186, rather than a stationary furniture component. The first chamber 184 includes a slot 185 with a keyway 188 on the distal end, wherein the keyway 188 is configured such that the pin 154 may be inserted therein. As mentioned with respect to the embodiment of FIGS. 4 and 4A, due to the interaction of the first piston rod 115 and the second piston rod 117 via the pinion 152, the first piston rod is spring biased in the closing direction of the damper 100. Thus, the pin 154, which is coupled to the first piston rod 115, is spring biased toward the proximal end of the slot 185.

Figure 6A:
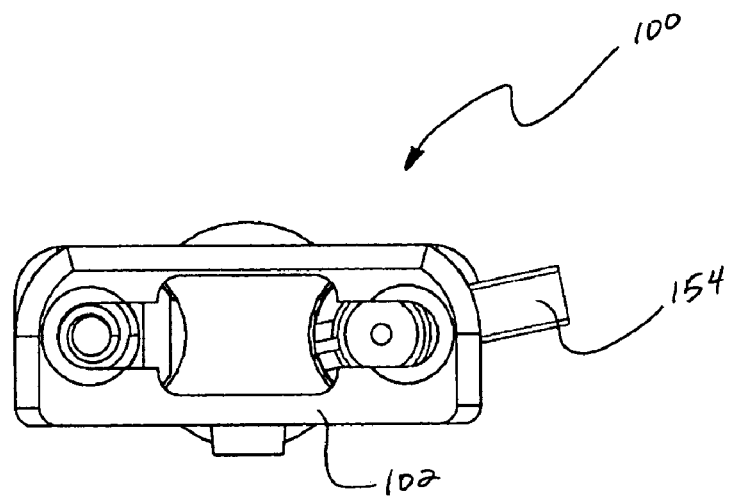
FIG. 6A is a front end view of the damper of FIG. 6, the pin being in the keyway.
Figure 6B:
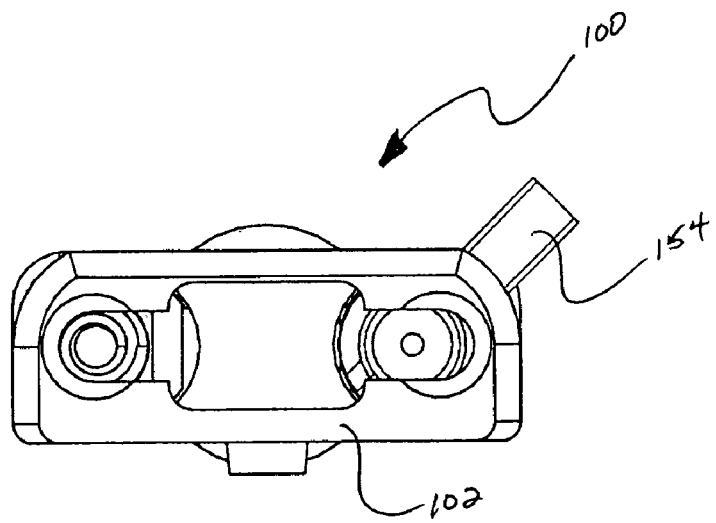
FIG. 6B is a front end view of the damper of FIG. 6, the pin being in the slot.

FIGS. 6A and 6B are front end views of the damper of FIG. 6, with the pin 154 being in the keyway 188 and the slot 185, respectively. Because the pin 154 is spring biased toward the proximal end of the slot 185, it will return to the proximal end of the slot unless it is held in place. The keyway serves the purpose of holding the pin in place, allowing the urging force of the piston spring 103 to be resisted. Thus, when the pin is in the keyway, as shown in FIG. 6A, it is in a "loaded" position. Once released from the keyway, the urging force of the piston spring 103 is no longer resisted, and the pin is urged to the proximal end of the slot.

Figure 7:
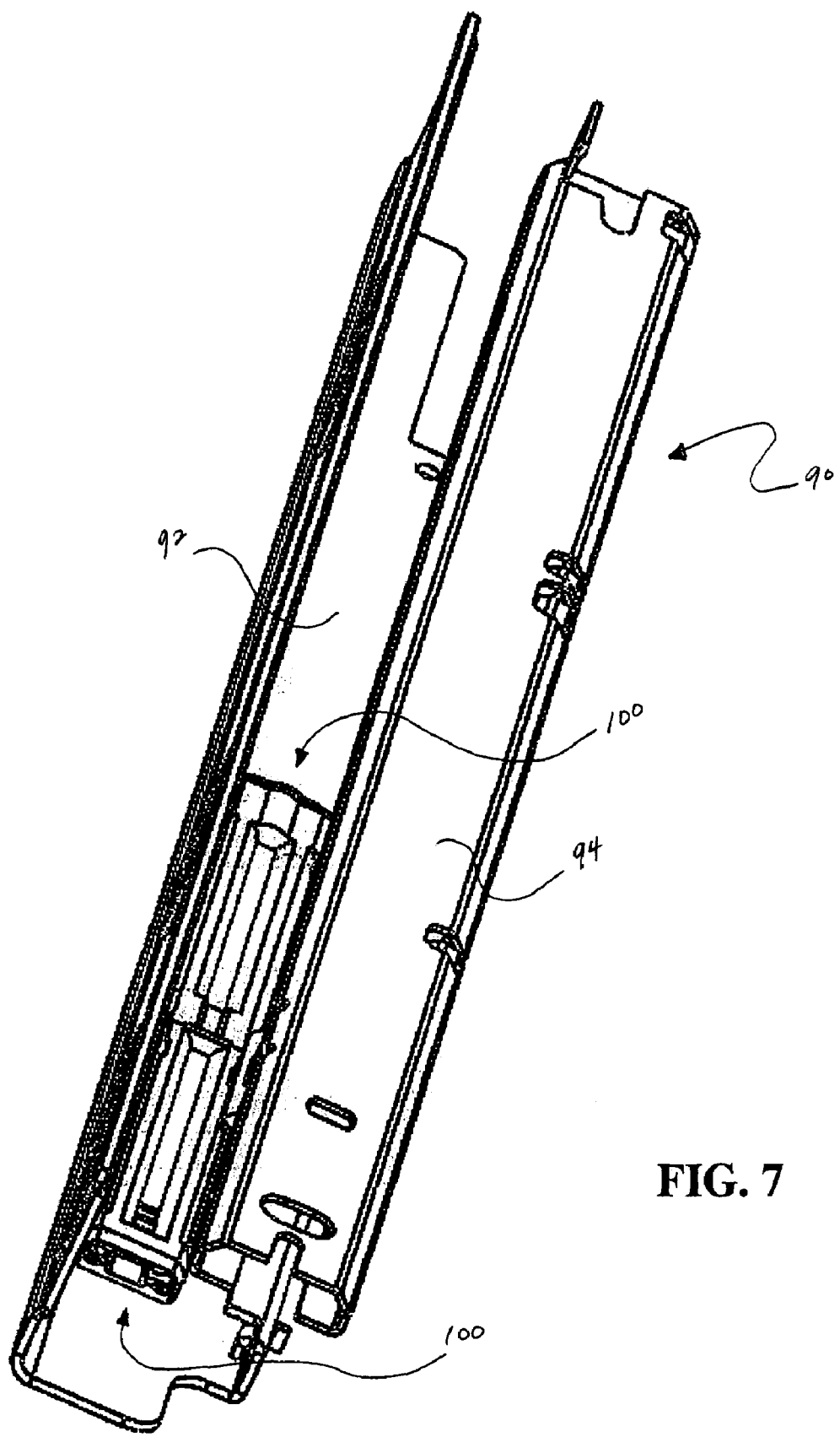
FIG. 7 is a perspective view of the damper of FIG. 6 mounted on a stationary rail of a drawer slide, the movable rail being in a retracted position.

The damper 100 is preferably mounted on a stationary rail of a drawer slide, as shown in FIG. 7. FIG. 7 is a perspective view of the damper of FIG. 6 mounted on a stationary rail 92 of a drawer slide 90. A movable rail 94 may be slideably coupled to the stationary rail 92, either directly, or via an intermediate rail. The movable rail is movable between an extended position and, as shown in FIG. 7, a retracted position, with respect to the stationary rail 92. The stationary rail 92 is preferably mounted on a stationary furniture component, such as a cabinet, and a movable furniture component, such as a drawer, is preferably mounted on the movable rail 94.

Figure 7A:
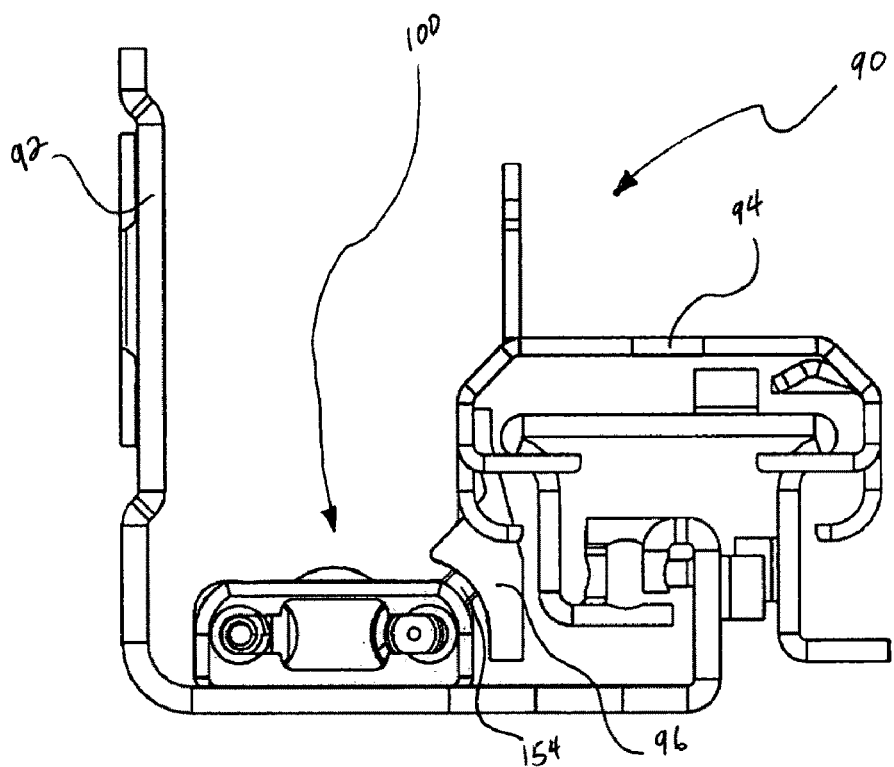
FIG. 7A is an enlarged front end view of the arrangement of FIG. 7, the movable rail being in a retracted position.
Figure 7B:
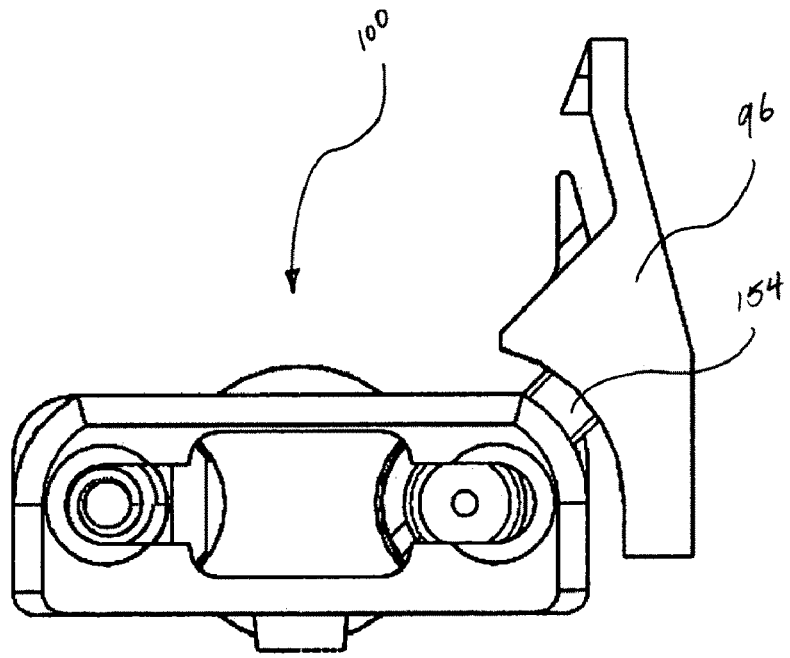
FIG. 7B is an enlarged front end view of the arrangement of FIG. 7, but without the drawer slide.

FIG. 7A is an enlarged front end view of the arrangement of FIG. 7, the movable rail being in a retracted position. FIG. 7B is an enlarged front end view of the arrangement of FIG. 7, but without the drawer slide 90. As shown in FIG. 7A, a coupling member or a setter 96 is mounted on the movable rail 94. When the movable rail is in a retracted position, the pin 154 is in the slot 185 (see FIG. 6B which shows an enlarged front end view of the damper, with the pin being in the slot), and is engaged with the setter 96 (see FIG. 7C).

Figure 7C:
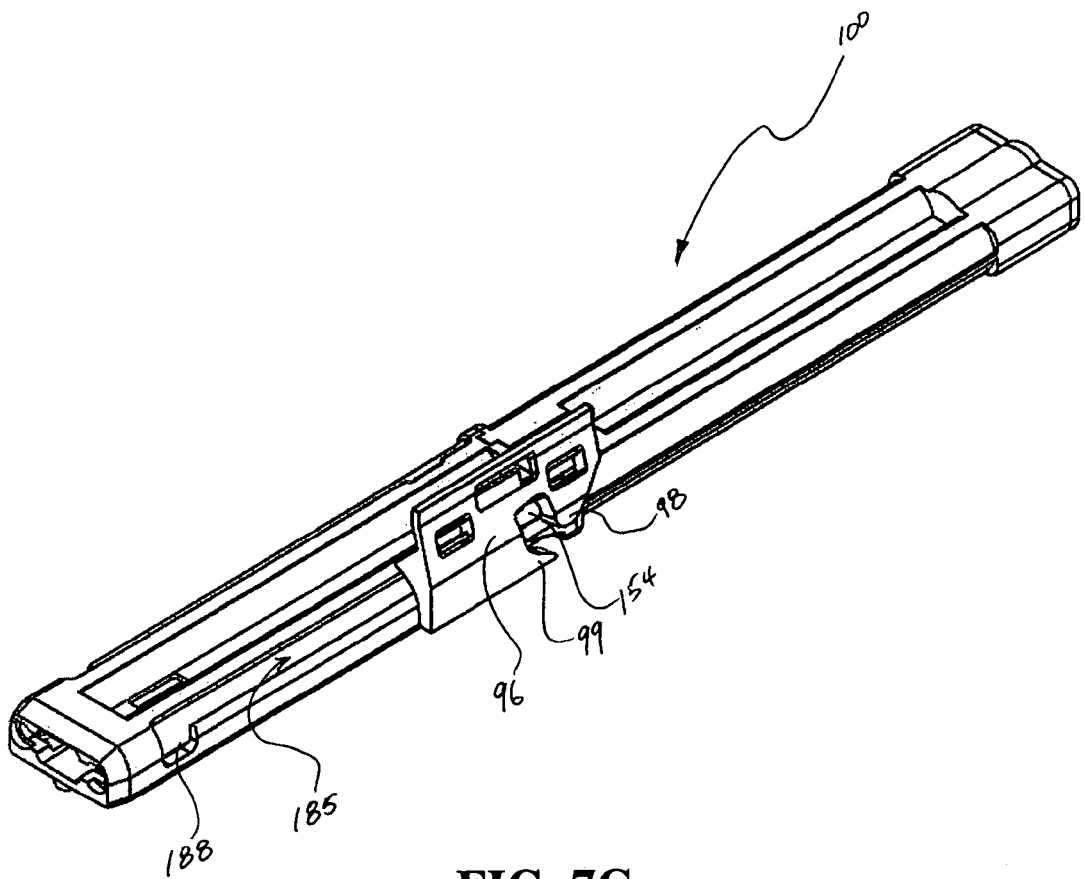
FIG. 7C is a perspective view of the arrangement of FIG. 7, but without the drawer slide.

FIG. 7C is a perspective view of the arrangement of FIG. 7, but without the drawer slide 90. As shown in FIG. 7C, the setter 96 includes a setting lip 98 and a disengaging lip 99. When the movable rail is in a retracted position, the setter 96 is located at the proximal end of the slot 185, and the pin 154, which extends out of, and is spring biased toward, the proximal end of the slot 185, is in engagement with the setter 96.

Figure 7D:
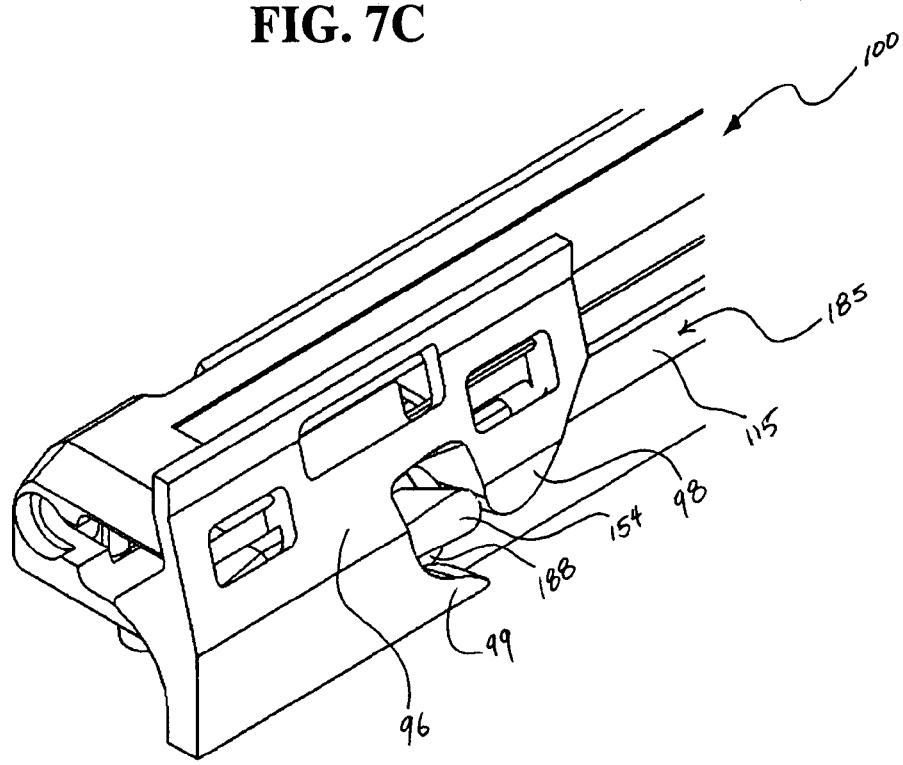
FIG. 7D is an enlarged perspective view of the setter as it urges the pin into the keyway.

When the drawer slide is pulled open, i.e., when a drawer mounted on the movable rail 94 of the drawer slide 90 is manually pulled out from an associated cabinet, the movable rail 94 slides in the opening direction of the damper. Thus, the setter 96, which is coupled to the movable rail 94, moves the pin 154 along the slot 185 toward the keyway 188. As this occurs, the first piston rod 115 rotates the pinion 152 in a clockwise direction, causing the second piston rod 117 to move in the closing direction of the damper 100, thereby causing the piston spring 103 to expand. Once the pin 154 reaches the keyway 188, the setting lip 98, due to the curvature of the setting lip surface which abuts the pin, urges the pin into the keyway. FIG. 7D is an enlarged perspective view of the setter 96 shown in FIG. 7C just as it begins to urge the pin 154 into the keyway 188. After the pin 154 has been pushed far enough into the keyway by the setting lip 98, the setting lip is able to slide over the pin and the setter 96 is no longer engaged with the pin 154. Thus, the movable rail is free to move to a fully extended position with respect to the stationary rail 92. In addition, because the pin 154 is seated in the keyway 188, the pin is in a locked and loaded position until it is unseated.

Figure 7E:
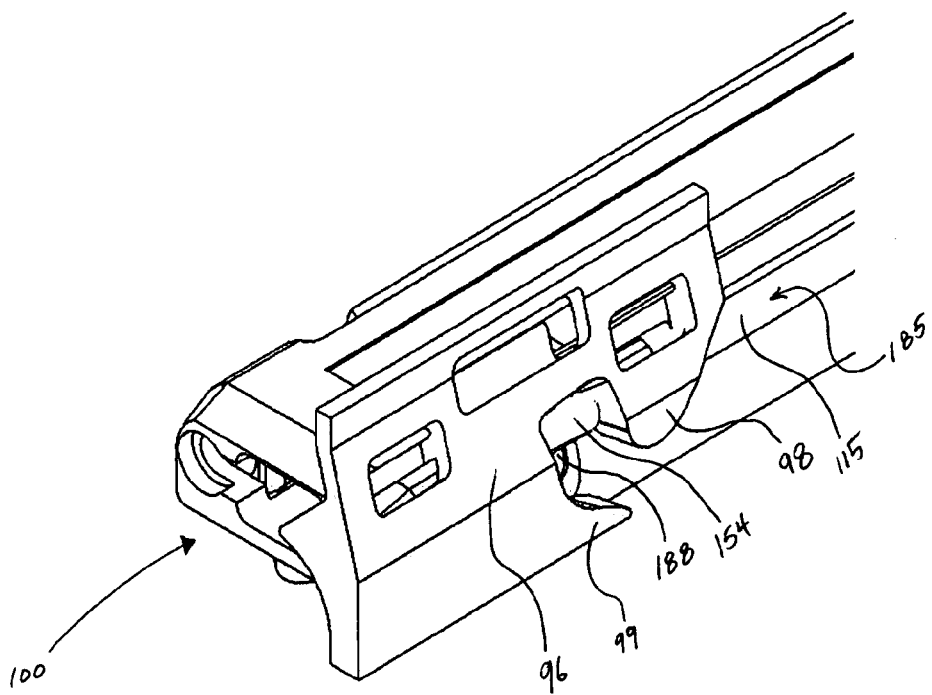
FIG. 7E is an enlarged perspective view of the setter engaged with the pin.

When the drawer slide is pushed back to a closed position, the dislodging lip 99 of the setter 96 comes into abutment with the pin 154. The abutting surface of the dislodging lip is angled upward relative to the pin. Thus, as the dislodging lip 99 continues to move toward the proximal end of the slot 185, it forces the pin 154 out of the keyway 188. Once the pin is completely removed from the keyway 188 and is engaged with the setter 96 (see FIG. 7E), the piston spring 103 retracts, pulling the second piston rod 117 in the opening direction of the damper. This causes the pinion 152 to rotate in a counter-clockwise direction which causes the pin 154 to move toward the proximal end of the slot 185.

Figure 8:
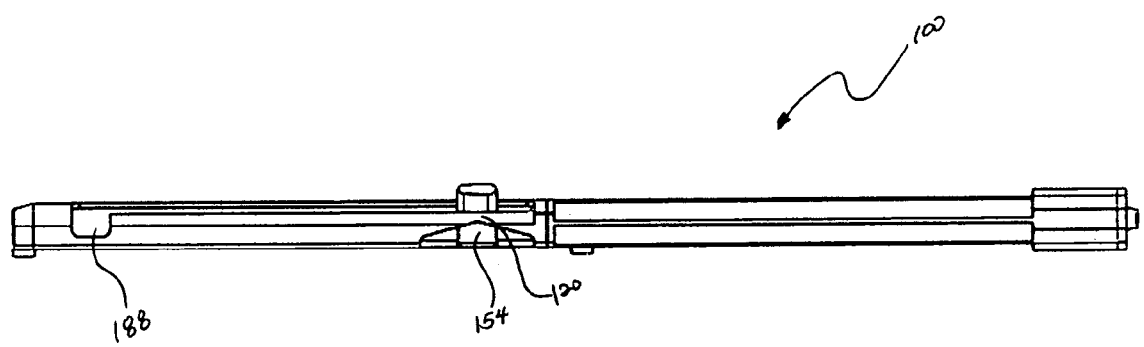
FIG. 8 is a side view of the damper of FIG. 6.

In normal operation, the pin 154 remains seated in the keyway 188 until it is dislodged by the setter 96. Nevertheless, it is possible for the pin to be inadvertently dislodged by other means. When this happens, the setter 96 must be able to re-engage with the pin 154 so that the damper can perform its closing and damping functions. Thus, as shown in FIG. 8, a flexible edge 120 of the damper 100 abuts the inadvertently tripped pin 154. The flexible edge 120 has been made flexible by reducing its thickness and shaping it so that it is weakest in the area against which the pin abuts when inadvertently tripped. As a result, when the drawer slide 90 is pushed back to a closed position, the setting lip 98 can pass over the pin 154 by pressing the pin into the flexible edge 120 thereby causing the flexible edge to flex away from the slot 185. The flexible edge 120 is sufficiently resilient to return to its original state once the setting lip 98 of the setter 96 passes over the pin 154. By returning to its original position, the weakened edge 120 pushes the pin 154 back into engagement with the setter 96.

A particular advantage of the damper 100 is that, in addition to its damping function, it incorporates a closing/moving function in a fully integrated manner. As a result, the damper is more compact than closure/damper arrangements that are not fully integrated. Also, the damper of the present invention is more robust, cost-effective, and easier to assemble and install because the closing and damping functions are performed by a single compact device. By contrast, in typical damper/closure arrangements, the damping is performed by one device, the closing is performed by another device, and the two devices are coupled together. In other words, in the typical arrangement, two separate, non-integrated devices are required to perform the closing and damping functions. Another advantage of the damper 100 is that because of the unique operation of the regulator 118, the damper can vary the amount of damping based on the speed of an associated movable furniture component more effectively.

Figure 9:
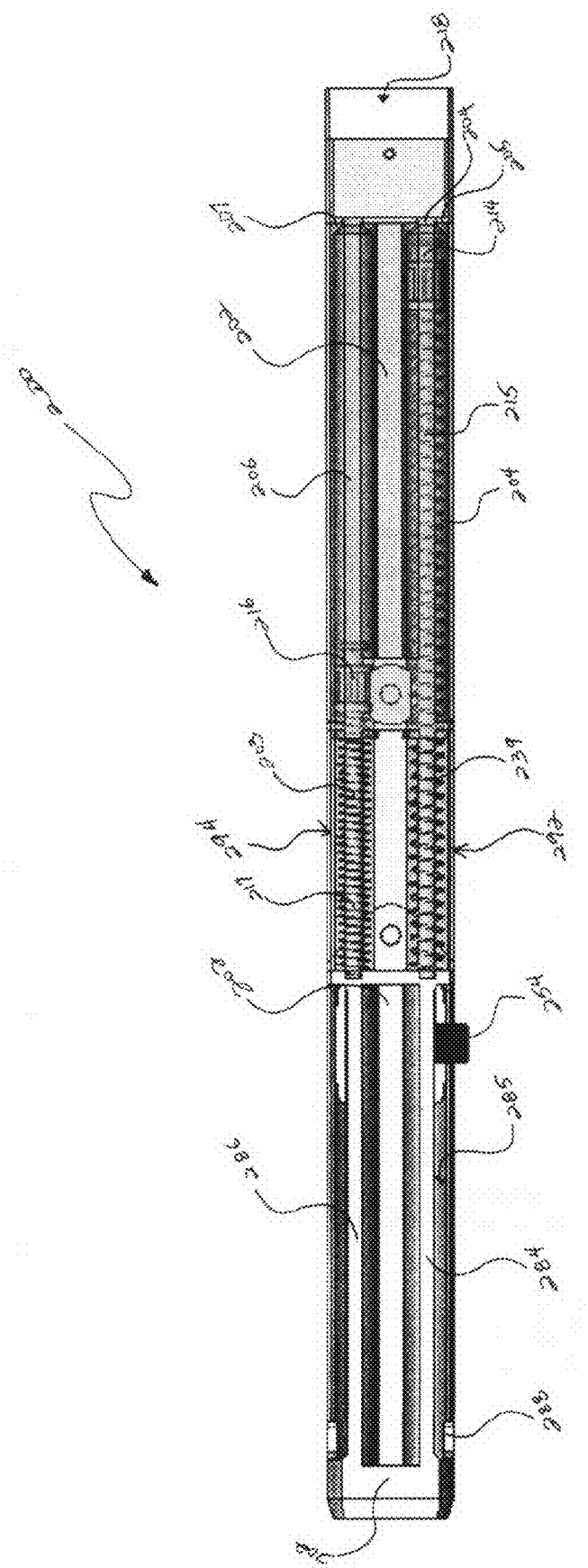
FIG. 9 is a plan view of a damper employing a dual-spring system, the damper being in a closed position.

FIG. 9 illustrates a damper that is similar to the damper of FIG. 6, except that the damper of FIG. 9 employs a dual-spring system rather than a rack-and-pinion system. The damper 200, which is shown in a closed position in FIG. 9, includes a housing 202, a first spring 239, a second spring 203, a regulator 218, a first piston disc 214, a first piston rod 215 to which a pin 254 is coupled, a second piston disc 216 and a second piston rod 217. The housing 202 includes a first fluid conduit 204, a second fluid conduit 206, a first spring chamber 292, a second spring chamber 294, a first piston chamber 284 including a slot 285 with a keyway 288 on the distal end, and a second piston chamber 286. The first fluid conduit 204 includes a first annular protrusion 205 which extends from an interior surface of the first fluid conduit 204 and provides a stop surface for the first piston disc 214. The second fluid conduit 206 includes a second annular protrusion 207 which extends from an interior surface of the second fluid conduit 206 and provides a stop surface for the second piston disc 216.

The first fluid conduit is in fluid communication with the second fluid conduit via the regulator 218. The first spring chamber 292 is in-line with and connected to both the first fluid conduit 204 and the first piston chamber 284 such that the first piston rod 215 may be slideably arranged within all three of the first fluid conduit 204, the first spring chamber 292 and the first piston chamber 284. Similarly, the second spring chamber 294 is in-line with and connected to both the second fluid conduit 206 and the second piston chamber 286 such that the second piston rod 217 may be slideably arranged within all three of the second fluid conduit 206, the second spring chamber 294 and the second piston chamber 286. The first and second piston discs 214 and 216 are slideably arranged within the first and second fluid conduits 204 and 206, respectively. A fluid resides between the first piston disc 214 and the second piston disc 216. The piston discs may be provided with respective seals configured to fit tightly against the inner surface of the associated fluid conduit to prevent fluid from leaking out from between the first and second piston discs.

The first spring 239 may be wrapped around the first piston rod 215, with one end coupled to the first piston disc 214 and the other end coupled to the distal end of the first spring chamber 292. The second spring 203 may be wrapped around the second piston rod 217, with one end coupled to the second piston disc 216 and the other end coupled to the distal end of the second spring chamber 294. Both the first spring 239 and the second spring 203 are of the compression type, the first spring 239 having a substantially higher spring constant than the second spring 203.

Figure 10:
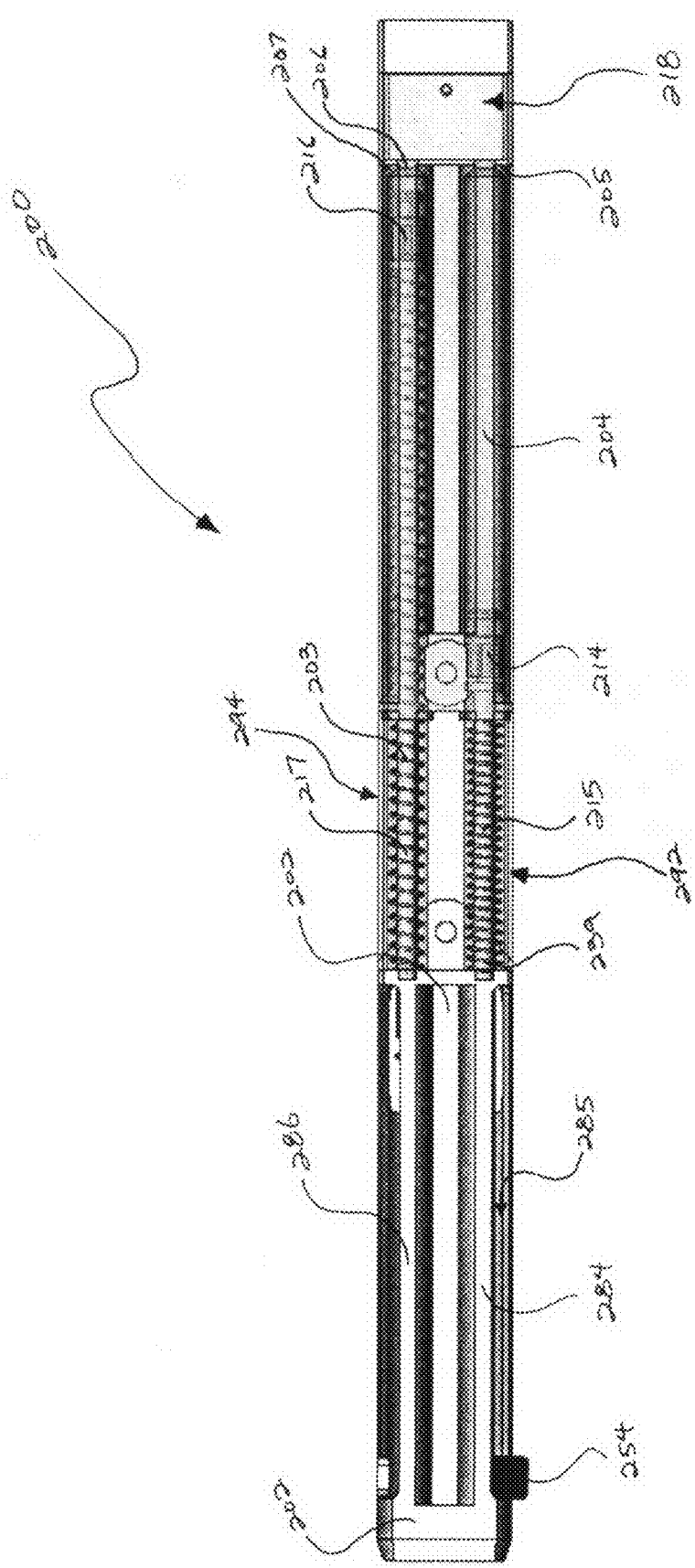
FIG. 10 is a plan view of the damper of FIG. 9 in an open position.

As with the damper of FIG. 6, the damper of FIG. 9 is preferably mounted on a stationary rail of a drawer slide, the drawer slide having a setter like the one shown in FIGS. 7A-7E on a movable rail. When the drawer slide is pulled open, the setter moves the pin 254 along the slot 285 toward the keyway 288. As this occurs, the first spring 239 compresses, while the second spring expands to urge the second piston disc 216 toward the regulator 218. As described in further detail with regard to FIGS. 7C and 7D, once the pin 254 reaches the keyway 288, the setter pushes the pin 254 into the keyway 288 and slides past the pin 254. FIG. 10 shows the damper 200 in an open position, with the pin 254 inserted in the keyway 288.

When the drawer slide is closed, the setter dislodges the pin 254 from the keyway. This is described in further detail with regard to FIGS. 7C, 7D, and 7E. Because the first spring 239 has a substantially higher spring constant than the second spring 203, the pin 254 is biased toward the proximal end of the slot 285. As a result, once the pin 254 has been dislodged, the first spring 239 expands, causing the dislodged pin 254 to act on the setter and move the movable rail to a closed position. At the same time, the first piston disc 214 drives the fluid through the regulator 218 and into the second fluid conduit 206. Damping in this embodiment is achieved in the same way as described with respect to the embodiment of FIGS. 1 and 1A. More specifically, the regulator 218 operates in the same way as the regulator 18 of FIGS. 1 and 1A.

As will be easily understood by those of skill in the art, the fluid utilized to achieve the damping effect in the embodiments described herein is preferably a fluid having relatively high viscosity, e.g., oil, however the fluid may be any type of fluid. Similarly, the springs may be conical, expansion, compression, leaf or any other type of spring. The movable member in the first fluid conduit may be a piston disc, a piston rod, or a piston disc coupled to a piston rod. Likewise, the movable member in the second fluid conduit may be a piston disc, a piston rod, or a piston disc coupled to a piston rod.

A damper according to the present invention may include more than two fluid conduits. For example, in a damper having four fluid conduits, the first fluid conduit may be in fluid communication with the second, the second with the third, and the third with the fourth. The damper may include two movable members slideably arranged in the first and fourth fluid conduits, respectively. The damper may include at least one regulator disposed within any of the fluid conduits, or between any two of the fluid conduits.

The regulator of the embodiments described herein may include one or three or more orifices with movable valves disposed therein as opposed to two. In addition, although each valve of the regulator depicted in FIG. 2 includes two bypass channels, the valves may have no bypass channels, or may have three or more bypass channels. In addition, the bypass channels may run through the valves, rather than along the sides of the valves. Further, the regulator may include orifices that are not paired with valves which may also act as bypass channels.

It should also be noted that FIG. 3 shows a valve in a seated position and a valve in an unseated position because it is preferable that one of the valve springs be stronger than the other. For this reason, if a movable furniture component is moving at a certain rate of speed, it is possible for the pressure to be sufficient to cause one of the valves to be fully seated, but insufficient to cause the other valve to move from its unseated position (or, to become fully seated). Providing valve springs with differing spring constants creates a greater range of damping variation. However, in embodiments of the invention, the valve springs may possess equivalent spring constants.

In addition, one or more of the valves may be spring biased, while the others are freely movable between a seated position and an unseated position. In this case, during the opening stroke (when the damper returns from a closed position to an open position), the orifices with unbiased valves disposed therein would provide additional space through which the fluid can flow from the second fluid conduit to the first fluid conduit. During the closing stroke (when the damper moves from an open position to a closed position), the unbiased valves would quickly move to the fully seated position regardless of closure speed, thereby forcing the fluid to flow through the orifices with spring biased valves disposed therein. This would provide a more defined and controlled closure at slower engagement speeds.

The valves may be positioned at varying distances away from their corresponding orifices. For example, in a regulator with three orifices, each with a movable valve disposed therein, the first valve may be biased toward an unseated position that is a distance x away from the valve seat in the first orifice, the second valve may be biased toward an unseated position that is a distance y away from the valve seat in the second orifice, and the third valve may be biased toward an unseated position that is a distance z away from the valve seat in the third orifice, wherein x>y>z. Further, the valves and orifices may be shaped like an oval, a polygonal shape, or any other shape, and do not need to be similarly shaped. The orifices may be generally cylindrical, conical, and/or may have multiple stages. A valve may include a hollowed-out region on the side opposite the orifice which would help increase the fluid pressure on the valves. Also, instead of a valve, the regulator may employ a flexible element which opens when fluid flows through the corresponding orifice in one direction, and closes to varying degrees when fluid flows in the other direction depending on how fast the fluid is flowing. For example, the regulator may employ a molded-in spring, described in further detail below with respect to FIG. 11, and/or an elastically biased flap.

In embodiments of the invention, the damper housing may be composed of a rigid material such as plastic, steel, ceramics, and the like. The housing may be modular, i.e., the fluid conduits may be separable from each other and/or the chambers or piston chambers, etc., or may be fully integrated, i.e., molded together or manufactured from a single mold. For ease of manufacture and assembly, the portion of the regulator which forms the orifices may be manufactured as a separate component which may then be inserted between the first and second fluid conduits. Alternatively, that portion may be integral with the housing. Further, the second chamber or second piston chamber may also include a slot with a keyhole on the distal end, as shown in FIGS. 6, 7C, 7D, 7E and 9, so that the pin can be positioned on either side. However, if the pin is positioned in the slot of the second cylinder, the orientation of the regulator and spring bias should preferably be reversed.

The cross section of a fluid conduit may be shaped like a circle, an oval, a square, a rounded square, a triangle, or any other polygonal shape. The cross section of one portion of a fluid conduit may also be shaped differently than the cross section of another portion of the conduit.

Figure 11:
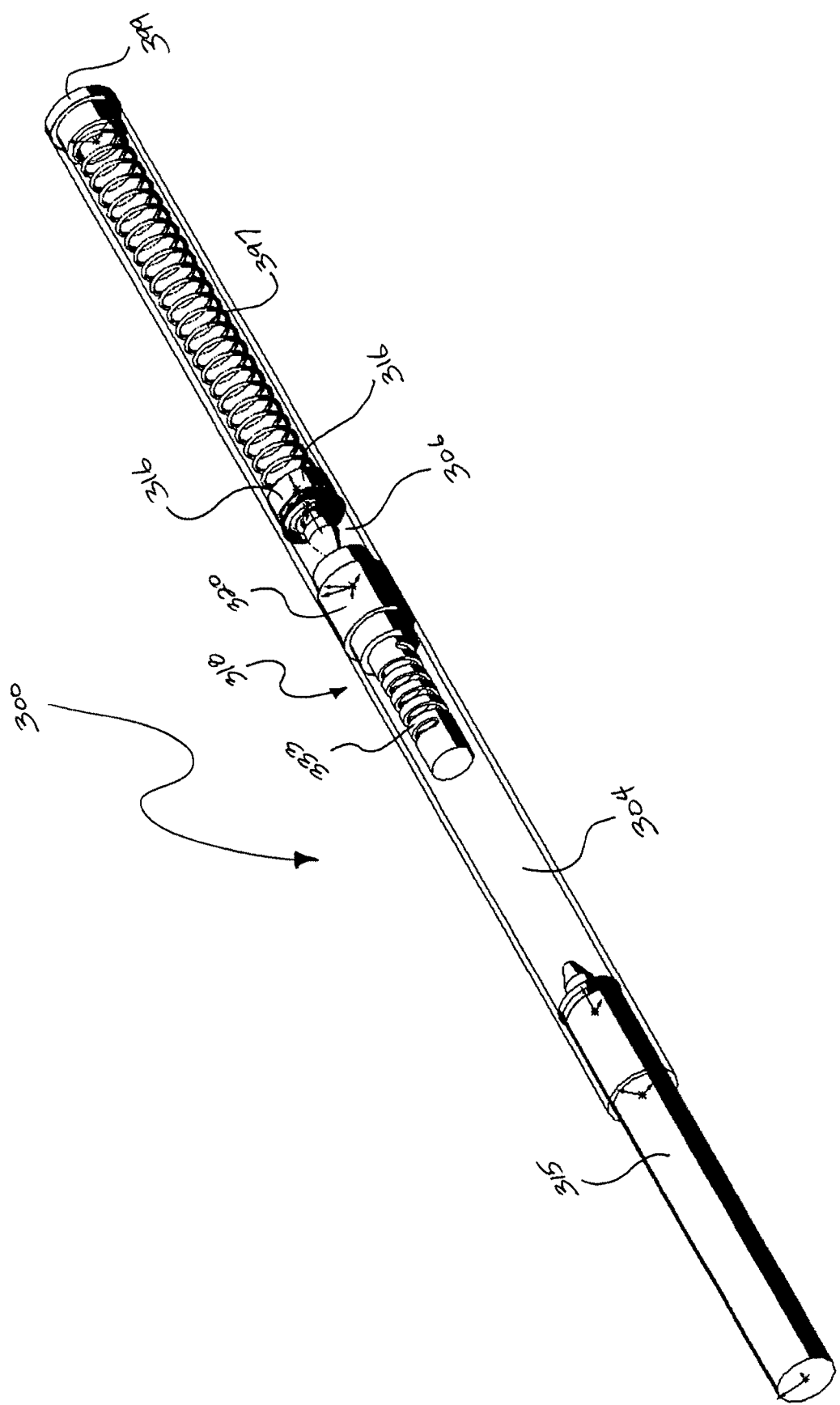
FIG. 11 is a perspective view of a damper in accordance with an alternative embodiment of the present invention, the piston rod being in an extended position.
Figure 13:
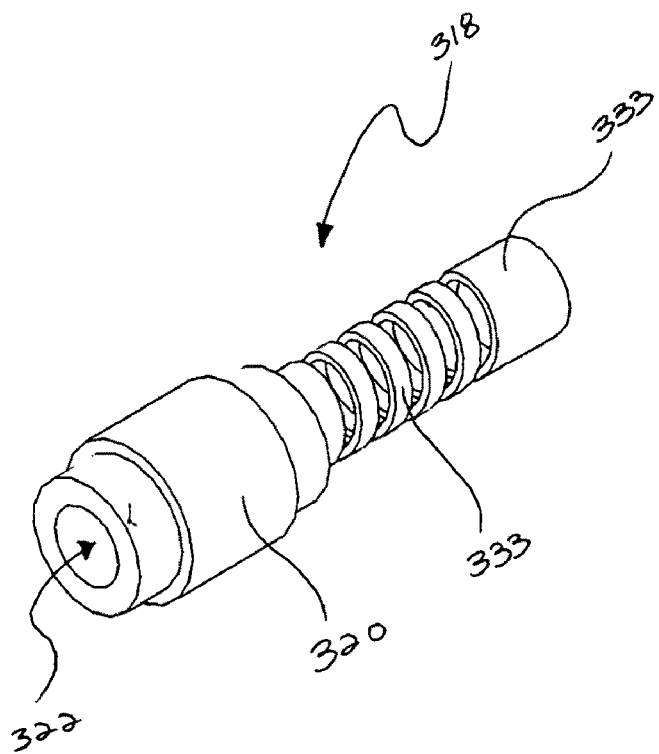
FIG. 13 is an enlarged perspective view of a regulator according to an alternative embodiment of the present invention.
Figure 14:
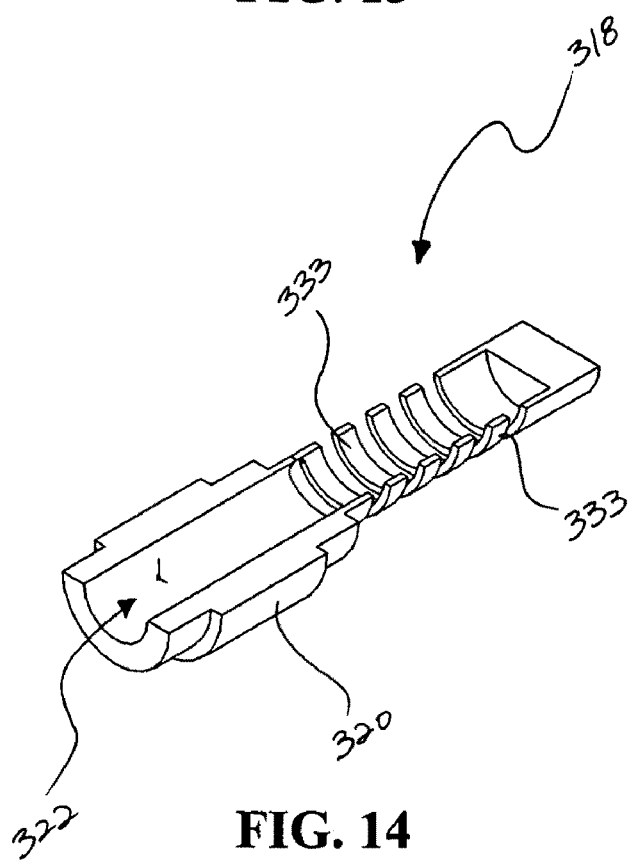
FIG. 14 is a cross-sectional view of the regulator of FIG. 13.

Moreover, rather than being generally parallel to each other, the fluid conduits may be angled with respect to each other, or may be in line with each other as shown in FIG. 11. FIG. 11 is a perspective view of a damper 300 including a first fluid conduit 304, in-line with and coupled to a second fluid conduit 306, a molded-in spring regulator 318 disposed therebetween, a piston disc 316, a piston rod 315, a rear end cap 399 and a compression spring 397. As shown in FIGS. 13 and 14, the molded-in spring regulator includes a body portion 320 and a molded-in spring portion 333. Through the body portion 320 runs a generally cylindrical opening 322. The piston rod 315 is slideably arranged in the first fluid conduit 304, and protrudes therefrom. The piston disc 316 is slideably arranged in the second fluid conduit 306. The compression spring 397 is disposed between the piston disc 316 and the rear end cap 399. A fluid resides between the piston rod 315 and the piston disc 316. The molded-in spring regulator 318 may alternatively be a regulator having an orifice with a movable valve disposed therein such as the regulator in the embodiment of FIGS. 1 and 1A.

Figure 12:
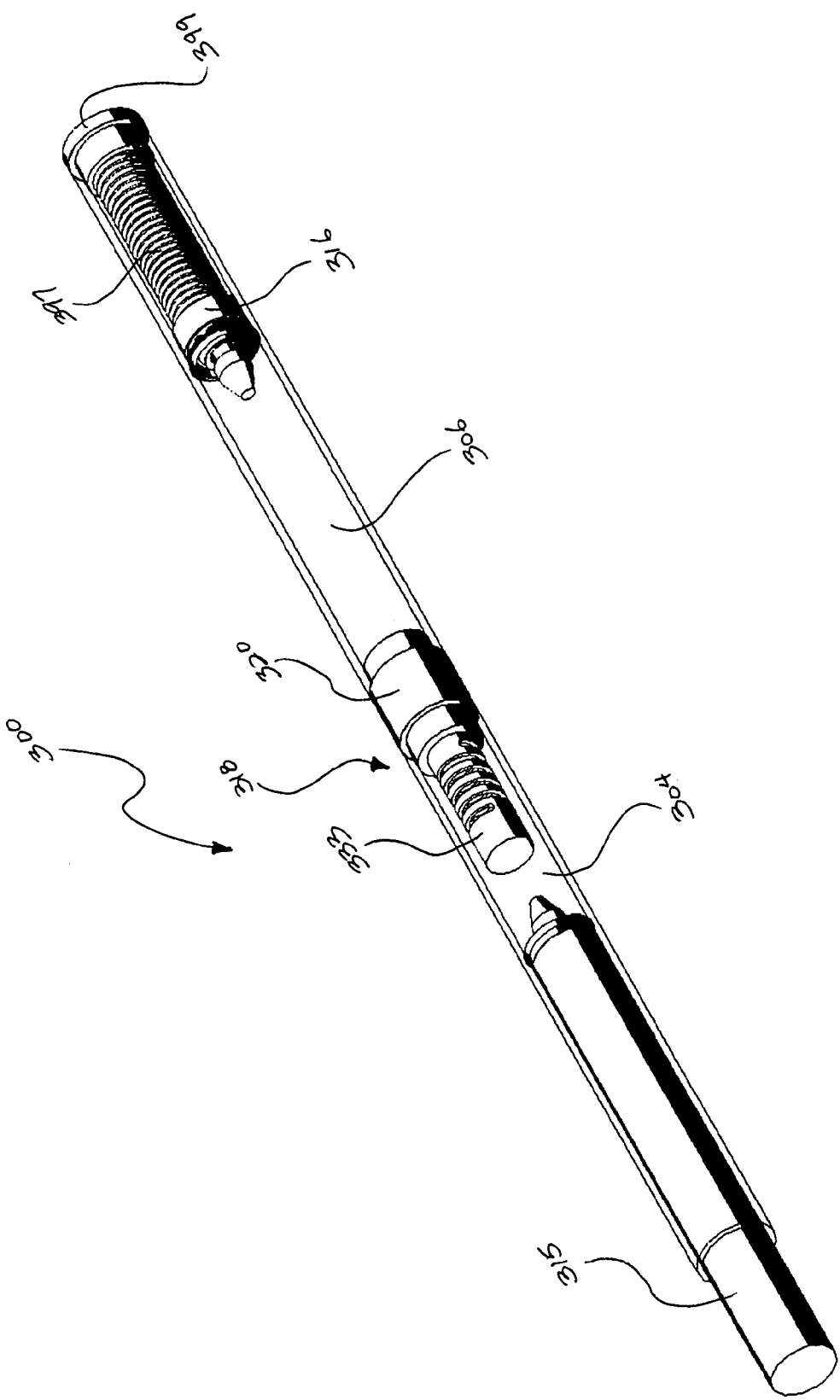
FIG. 12 is a perspective view of the damper of FIG. 11, the piston rod being in a retracted position.

In operation, a movable furniture component presses against the piston rod 315, causing it to move toward the molded-in spring regulator 318. Fluid moves through the openings between the coils of the molded-in spring portion 333, through the generally cylindrical opening 322 of the body portion 320, and into the second fluid conduit 306. Fluid pressure on the end of the molded-in spring portion 333 opposite the body portion 320 causes the molded-in spring portion 333 to compress, which closes the openings between the coils of the molded-in spring portion 333. As fluid pressure increases, the molded-in spring portion compresses to a greater degree, thereby imposing greater damping resistance on the piston rod 315. In this way, the molded-in spring regulator 318 is also capable of automatically adjusting to the speed of the movable furniture component. As fluid is urged through the molded-in spring regulator and into the second fluid conduit 306, the second piston disc 316 moves toward the rear end cap 399 and compresses the compression spring 397. After the damper 300 has dampened the movement of the movable furniture component, the piston rod 315 may remain in the retracted position because the compression spring 397 may not be strong enough to overcome the weight of the movable furniture component. FIG. 12 shows the piston rod 315 in a retracted position, and the compression spring 397 in a compressed state.

Once the movable furniture component is moved away from the piston rod 315, the compression spring 397 expands causing the piston disc 316 to move toward the molded-in spring regulator 318. Fluid moves through the generally cylindrical opening 322 of the body portion 320, through the coils of the molded-in spring portion 333, and into the first fluid conduit 306. Fluid pressure on the end of the molded-in spring portion 333 opposite the body portion 320 is now directed toward the piston rod 315, and thus, causes the molded-in spring portion 333 to expand. As a result, the openings between the coils of the molded-in spring portion 333 expands, creating more space through which the fluid can flow. As fluid flows through the molded-in spring regulator 318 and into the first fluid conduit 304, the first piston rod 315 is moved to an extended position with respect to the first fluid conduit 304, as shown in FIG. 11.

If it is desired to add closing functionality to the damper 300, a housing may enclose the portion of the piston rod 315 which protrudes from the first fluid conduit 304, and an additional compression may be disposed between the housing and the end of the piston rod 315 distal the molded-in spring regulator 318, wherein the additional compression spring has a substantially higher spring constant than the compression spring 397. A first actuating member such as a pin may be coupled to the piston rod 315. The housing may include a slot having a keyway on one end. The slot may be configured to allow the pin to fit therein such that when the pin is inserted in the slot, it is in a locked and loaded position. A second piston rod may be coupled to the second piston disc 316 and may protrude out from a central opening in the rear end cap 399. The piston rods may be connected to each other via a connecting rod external to the fluid conduits to fix their position relative to one another, and thereby minimize fluid leakage. The damper may be fixedly mounted on a stationary rail of a drawer slide having a movable rail with a coupling member, such as a setter, mounted thereto. The closing function of the damper would be carried out in a manner similar to that described with respect to the damper of FIG. 6. Thus, the damper 300 can also act as a fully integrated closure/damper mechanism.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A damper for a movable furniture component, the damper comprising:
    a first fluid conduit;
    a second fluid conduit in fluid communication with the first fluid conduit;
    a regulator disposed between the first and second fluid conduits for regulating the flow of fluid therebetween; and
    a first axially movable member disposed within the first fluid conduit and configured to be selectively engaged with the movable furniture component,
    wherein said movable furniture component is configured to repeatedly move between a closed position and an open position, and the regulator is configured to control the flow of fluid between the first and second fluid conduits based on the speed of the first movable member so as to dampen the movement of the movable furniture component in accordance with said speed each time said movable furniture component moves from said open position towards said closed position.

2. The damper of claim 1 further comprising:
    a second movable member disposed within the second fluid conduit,
    wherein, when fluid is urged by the first movable member through the regulator to the second fluid conduit, the second movable member is urged to move away from the regulator.

3. The damper of claim 2, wherein the second movable member is a piston disc that is spring biased toward the regulator.

4. The damper of claim 2, wherein the first and second fluid conduits are in a generally parallel and side-by-side configuration.

5. The damper of claim 1, wherein the regulator includes a valve disposed within an orifice, the valve being moveable between a seated position and an unseated position with respect to the orifice, and being biased toward the unseated position.

6. The damper of claim 5, wherein the regulator further includes a valve spring urging the valve toward the unseated position.

7. The damper of claim 5, wherein the valve includes a bypass channel permitting fluid to flow through the orifice when the valve is in the seated position.

8. The damper of claim 1, wherein the regulator includes a plurality of orifices, each with a valve biased toward an unseated position disposed therein, wherein one of the valves is more strongly biased toward an unseated position than another of the valves.

9. The damper of claim 1, wherein a portion of the regulator has an elongated spring-like configuration.

10. The damper of claim 9, wherein the elongated spring-like portion is configured to permit fluid to flow into and out of the regulator.

11. The damper of claim 4, wherein the first movable member is a first rod and the second movable member is a second rod.

12. The damper of claim 11, further comprising:
    an actuating member coupled to the first rod;
    a first elongated hollow body in-line with and coupled to the end of the first fluid conduit distal the regulator, and configured to permit the first rod to slide therein, the first elongated hollow body having a slot extending longitudinally along a length thereof,
    wherein the slot is configured to permit the actuating member to slide therein, and the first rod is spring biased toward the regulator.

13. The damper of claim 12, further comprising a first spring urging the first rod toward the regulator, and a second spring urging the second rod toward the regulator.

14. The damper of claim 12 further comprising:
    a second elongated hollow body in-line with and coupled to the end of the second fluid conduit distal the regulator, and configured to permit the second rod to slide therein.

15. The damper of claim 14, wherein the first and second elongated hollow bodies are generally cylindrical.

16. The damper of claim 12, wherein the damper is joined to a drawer slide, the drawer slide having a stationary rail configured to be joined to a stationary furniture component and a movable rail configured to be joined to the movable furniture component, the movable rail being movable between an extended position and a retracted position, and wherein said actuating member selectively engages with a coupling member joined to the movable rail such that the movable rail is urged toward the retracted position.

17. The damper of claim 1, wherein the regulator includes a plurality of orifices, each with a valve disposed therein, wherein at least one of the valves is spring biased toward an unseated position.

18. The damper of claim 2, wherein the first movable member includes a seal configured to fit tightly against the interior surface of the first fluid conduit, and the second movable member includes a seal configured to fit tightly against the interior surface of the second fluid conduit.

19. A damper for a movable furniture component, the damper comprising:
    a first fluid conduit;
    a second fluid conduit;
    a channel disposed between, and near respective ends of, said first and second fluid conduits, and configured to allow fluid communication between said first and second fluid conduits, said channel having a valve seat formed therein facing said first fluid conduit;
    a movable valve disposed within said channel such that it is facing said valve seat, but is spring biased away from said valve seat;
    a first movable member slideably arranged within said first fluid conduit for repeated dampened movement towards said channel when the movable furniture component moves towards a closed position, said first movable member moving away from said channel when the movable furniture component moves towards an open position; and a second movable member slideably arranged within said second fluid conduit, wherein, each time said movable furniture component moves towards said closed position, fluid is urged by said first movable member through said channel, said valve is urged toward said valve seat to varying degrees based on the speed of said first movable member, and said second movable member moves away from said channel.

20. The damper of claim 19, further comprising:

a second channel disposed between, and near respective ends of, said first and second fluid conduits, and configured to allow fluid communication between said first and second fluid conduits, said second channel having a second valve seat formed therein facing said first fluid conduit; and a second movable valve disposed within said second channel such that it is facing said second valve seat of said second channel.

21. The damper of claim 20, wherein said second movable valve is spring biased away from said second valve seat.

22. The damper of claim 20, wherein said second movable valve is freely movable between a seated position and an unseated position.

23. The damper of claim 19, wherein said first movable member is a first rod and said second movable member is a second rod.

24. The damper of claim 23, further comprising a pinion rotatably fixed between said first and second rods, wherein said first and second rods have teeth formed along the length thereof to operably engage the pinion.

25. A damper for a movable furniture component, the damper comprising:

a first fluid conduit;

a second fluid conduit in fluid communication with the first fluid conduit, said first and second fluid conduits being in a generally parallel and side-by-side configuration;

a regulator disposed between the first and second fluid conduits for regulating the flow of fluid therebetween;

a first rod disposed within the first fluid conduit and configured to be selectively engaged with the movable furniture component;

a second rod disposed within the second fluid conduit, wherein, when fluid is urged by the first rod through the regulator to the second fluid conduit, the second rod is urged to move away from the regulator; and a pinion, said first and second rods each having teeth formed along the length thereof to operably engage the pinion, wherein the regulator is configured to control the flow of fluid between the first and second fluid conduits based on the speed of the first rod so as to dampen the movement of the movable furniture component in accordance with said speed.

26. The damper of claim 25, wherein the regulator includes a valve disposed within an orifice, the valve being moveable between a seated position and an unseated position with respect to the orifice, and being biased toward the unseated position.

27. The damper of claim 26, wherein the valve includes a bypass channel permitting fluid to flow through the orifice when the valve is in the seated position.

28. The damper of claim 25, wherein the regulator includes a plurality of orifices, each with a valve disposed therein, wherein at least one of the valves is spring biased toward an unseated position.

29. The damper of claim 25, wherein the regulator includes a plurality of orifices, each with a valve biased toward an unseated position disposed therein, wherein one of the valves is more strongly biased toward an unseated position than another of the valves.

30. A damper for a movable furniture component, the damper comprising:

a first fluid conduit;

a second fluid conduit in fluid communication with the first fluid conduit, said first and second fluid conduits being in a generally parallel and side-by-side configuration;

a regulator disposed between the first and second fluid conduits for regulating the flow of fluid therebetween;

a first rod disposed within the first fluid conduit and configured to be selectively engaged with the movable furniture component;

a second rod disposed within the second fluid conduit, wherein, when fluid is urged by the first rod through the regulator to the second fluid conduit, the second rod is urged to move away from the regulator;

an actuating member coupled to the first rod;

a first elongated hollow body in-line with and coupled to the end of the first fluid conduit distal the regulator, and configured to permit the first rod to slide therein, wherein the first elongated hollow body has a slot extending longitudinally along a length thereof, the slot is configured to permit the actuating member to slide therein, and the first rod is spring biased toward the regulator; and a keyway extending laterally away from the slot, wherein the keyway is configured to permit the actuating member to fit therein such that the actuating member is selectively locked in position when it is disposed in the keyway, wherein the regulator is configured to control the flow of fluid between the first and second fluid conduits based on the speed of the first rod so as to dampen the movement of the movable furniture component in accordance with said speed.

31. The damper of claim 30, wherein the regulator includes a valve disposed within an orifice, the valve being moveable between a seated position and an unseated position with respect to the orifice, and being biased toward the unseated position.

32. The damper of claim 31, wherein the valve includes a bypass channel permitting fluid to flow through the orifice when the valve is in the seated position.

33. The damper of claim 30, wherein the regulator includes a plurality of orifices, each with a valve disposed therein, wherein at least one of the valves is spring biased toward an unseated position.

34. The damper of claim 30, wherein the regulator includes a plurality of orifices, each with a valve biased toward an unseated position disposed therein, wherein one of the valves is more strongly biased toward an unseated position than another of the valves.

35. A damper for a movable furniture component, the damper comprising:

a first fluid conduit;

a second fluid conduit in fluid communication with the first fluid conduit, said first and second fluid conduits being in a generally parallel and side-by-side configuration;

a regulator disposed between the first and second fluid conduits for regulating the flow of fluid therebetween;

a first rod disposed within the first fluid conduit and configured to be selectively engaged with the movable furniture component;

a second rod disposed within the second fluid conduit, wherein, when fluid is urged by the first rod through the regulator to the second fluid conduit, the second rod is urged to move away from the regulator;

an actuating member coupled to the first rod; and a first elongated hollow body in-line with and coupled to the end of the first fluid conduit distal the regulator and configured to permit the first rod to slide therein, wherein the first elongated hollow body has a slot extending longitudinally along a length thereof, the slot is configured to permit the actuating member to slide therein, and the first rod is spring-biased toward the regulator, wherein the damper is joined to a drawer slide, the drawer slide having a stationary rail configured to be joined to a stationary furniture component and a movable rail configured to be joined to the movable furniture component, the movable rail being movable between an extended position and a retracted position, and wherein said actuating member selectively engages with a coupling member joined to the movable rail such that the movable rail is urged toward the retracted position;

wherein the coupling member includes a setting lip and a dislodging lip, and when the movable rail is moved from the retracted position to the extended position, the setting lip pushes the actuating member into the keyway thereby disengaging the actuating member from the coupling member, and when the movable rail is moved from the extended position to the retracted position, the dislodging lip urges the actuating member from the keyway and into engagement with the coupling member; and wherein the regulator is configured to control the flow of fluid between the first and second fluid conduits based on the speed of the first rod so as to dampen the movement of the movable furniture component in accordance with said speed.

36. The damper of claim 35, wherein the regulator includes a valve disposed within an orifice, the valve being moveable between a seated position and an unseated position with respect to the orifice, and being biased toward the unseated position.

37. The damper of claim 36, wherein the valve includes a bypass channel permitting fluid to flow through the orifice when the valve is in the seated position.

38. The damper of claim 35, wherein the regulator includes a plurality of orifices, each with a valve disposed therein, wherein at least one of the valves is spring biased toward an unseated position.

39. The damper of claim 35, wherein the regulator includes a plurality of orifices, each with a valve biased toward an unseated position disposed therein, wherein one of the valves is more strongly biased toward an unseated position than another of the valves.

40. The damper of claim 35, further comprising a pinion, said first and second rods each having teeth formed along the length thereof to operably engage the pinion.

41. The damper of claim 35, further comprising a second elongated hollow body in-line with and coupled to the end of the second fluid conduit distal the regulator, and configured to permit the second rod to slide therein.

42. A damper for a movable furniture component, the damper comprising:

a first fluid conduit;

a second fluid conduit in fluid communication with the first fluid conduit, said first and second fluid conduits being in a generally parallel and side-by-side configuration;

a regulator disposed between the first and second fluid conduits for regulating the flow of fluid therebetween;

a first rod disposed within the first fluid conduit and configured to be selectively engaged with the movable furniture component;

a second rod disposed within the second fluid conduit, wherein, when fluid is urged by the first rod through the regulator to the second fluid conduit, the second rod is urged to move away from the regulator;

an actuating member coupled to the first rod; and a first elongated hollow body in-line with and coupled to the end of the first fluid conduit distal the regulator and configured to permit the first rod to slide therein, wherein the first elongated hollow body has a slot extending longitudinally along a length thereof, said slot is configured to permit the actuating member to slide therein, and the first rod is spring-biased toward the regulator, wherein the damper is joined to a drawer slide, the drawer slide having a stationary rail configured to be joined to a stationary furniture component and a movable rail configured to be joined to the movable furniture component, the movable rail being movable between an extended position and a retracted position, and wherein said actuating member selectively engages with a coupling member joined to the movable rail such that the movable rail is urged toward the retracted position;

wherein the coupling member includes a setting lip and a dislodging lip, and when the movable rail is moved from the retracted position to the extended position, the setting lip pushes the actuating member into the keyway thereby disengaging the actuating member from the coupling member, and when the movable rail is moved from the extended position to the retracted position, the dislodging lip urges the actuating member from the keyway and into engagement with the coupling member;

wherein the slot is defined by a flexible edge adapted to be urged away from the slot when the pin is pushed into the flexible edge by the setter such that, if the movable rail is in the extended position and the actuating member has been unseated from the keyway, moving the movable rail to the retracted position will cause the setting lip to press the actuating member into the flexible edge allowing the setting lip to pass over the pin and the coupling member to re-engage with the actuating member; and wherein the regulator is configured to control the flow of fluid between the first and second fluid conduits based on the speed of the first rod so as to dampen the movement of the movable furniture component in accordance with said speed.

* * * * *